(12) United States Patent
Kim

(10) Patent No.: US 8,989,241 B2
(45) Date of Patent: Mar. 24, 2015

(54) WIRELESS COMMUNICATION DEVICE WITH CONFIGURABLE SPATIAL TIME-FREQUENCY CODING AND METHODS FOR USE THEREWITH

(71) Applicant: Broadcom Corporation, Irvine, CA (US)

(72) Inventor: Joonsuk Kim, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/847,803

(22) Filed: Mar. 20, 2013

(65) Prior Publication Data

US 2013/0294487 A1 Nov. 7, 2013

Related U.S. Application Data

(60) Provisional application No. 61/643,186, filed on May 4, 2012, provisional application No. 61/646,210, filed on May 11, 2012, provisional application No. 61/660,299, filed on Jun. 15, 2012, provisional application No. 61/769,500, filed on Feb. 26, 2013.

(51) Int. Cl.
*H04B 1/38* (2006.01)
*H04B 7/04* (2006.01)
*H04L 1/00* (2006.01)
*H04L 1/06* (2006.01)

(52) U.S. Cl.
CPC ............ *H04B 7/0417* (2013.01); *H04L 1/0009* (2013.01); *H04L 1/0071* (2013.01); *H04L 1/0606* (2013.01); *H04L 1/0643* (2013.01)
USPC ........... 375/219; 370/329; 370/330; 375/260; 375/295; 375/299

(58) Field of Classification Search
None
See application file for complete search history.

(56) References Cited

U.S. PATENT DOCUMENTS

| 2004/0132496 | A1  | 7/2004  | Kim |
| 2007/0153925 | A1  | 7/2007  | Yang |
| 2007/0211822 | A1* | 9/2007  | Olesen et al. .................. 375/299 |
| 2011/0261898 | A1* | 10/2011 | Huang et al. .................. 375/295 |
| 2012/0093120 | A1* | 4/2012  | Ko et al. ........................ 370/329 |
| 2013/0064216 | A1* | 3/2013  | Gao et al. ...................... 370/330 |

FOREIGN PATENT DOCUMENTS

| EP | 1793519    | 6/2007  |
| EP | 2378690    | 10/2011 |
| KR | 20080094935 | 10/2008 |

OTHER PUBLICATIONS

Yu, et al.; Adaptive switching scheme for space-time coded OFDM systems; IEEE 62nd Vehicular Technology Conference, 2005. VTC-2005-Fall; pp. 1455-1459; vol. 3.

(Continued)

*Primary Examiner* — Adolf Dsouza
(74) *Attorney, Agent, or Firm* — Garlick & Markison; Bruce E. Stuckman

(57) ABSTRACT

A communication device includes a transmitter section that select a coding as either space time block coding (STBC), space frequency block coding (SFBC), hybrid space time/frequency block coding (ST/FBC), or a single stream multi-antenna spatial mapping. The transmitter section generates a transmit signal in accordance with the selected coding and transmits the transmit signal to the remote communication device via a plurality of antennas.

20 Claims, 30 Drawing Sheets

(56) References Cited

OTHER PUBLICATIONS

Lee, et al.; Design of Novel Orthogonal Space-Time-Frequency Block Codes for OFDM systems Over Fading Channel Environments; IEEE 66th Vehicular Technology Conference, 2007. VTC-2007 Fall; pp. 521-525.

European Patent Office; European Search Report; EP Application No. 13002095.1; Jun. 5, 2014; 3 pgs.

* cited by examiner $$a = avg\left(h_i^*(t_j)h_i(t_{j+1})\right) = \sum_{i=1}^{4}\sum_{j=1}^{3}\Re\left(h_i^*(t_j)h_i(t_{j+1})\right)/12$$

$$b = avg\left(h_i^*(f_j)h_i(f_{j+1})\right) = \sum_{i=1}^{4}\sum_{j=1}^{3}\Re\left(h_i^*(f_j)h_i(f_{j+1})\right)/12$$

$$c = avg\left(h_i^*(t_j,f_k)h_i(t_{j+1},f_{k+1})\right) = \sum_{i=1}^{4}\left[\Re\left(h_i^*(t_0,f_0)h_i(t_1,f_0)\right) + \Re\left(h_i^*(t_0,f_0)h_i(t_0,f_1)\right)\right]/16$$
$$+ \sum_{i=1}^{4}\left[\Re\left(h_i^*(t_0,f_1)h_i(t_1,f_1)\right) + \Re\left(h_i^*(t_1,f_0)h_i(t_1,f_1)\right)\right]/16$$

- $a$: correlation over time
- $b$: correlation over frequency
- $c$: correlation over time and frequency (hybrid)

- If max(a,b,c) < d, where d is a design parameter between 0 and 1, then Choose NO STBC
- elseif max(a,b,c) = a, then Choose 4Tx STBC
- elseif max(a,b,c) = b, then Choose 4Tx SFBC
- elseif max(a,b,c) = c, then Choose 4Tx Hybrid ST/FBC

FIG. 8

- for co-phase 4 × 1 STBC and/or SFBC, $c_{ij}$ can be selected to maximize the diagonal terms:

$$H_{sq} = H^*H = \begin{bmatrix} \Sigma & 0 \\ 0 & \Sigma \end{bmatrix} \quad \text{Eq. (1)}$$

$$\Sigma = |h_1 + c_1 h_3|^2 + |h_2 + c_2 h_4|^2 = \sum_i |h_i|^2 + [(c_1 h_1^* h_3 + c_1^* h_1 h_3^*) + (c_2 h_2^* h_4 + c_2^* h_2 h_4^*)]$$

$$= \sum_i |h_i|^2 + 2\Re(c_1 \alpha) + 2\Re(c_2 \beta) \quad \text{where} \quad \alpha = h_1^* h_3, \beta = h_2^* h_4, \text{ and } \Re \text{ denotes "real part"}$$

Then, choose $c_1 = \exp(j\theta_1), c_2 = \exp(j\theta_2)$ with the angles
$\theta_1 = angle(\alpha), \theta_2 = angle(\beta)$
to maximize the diagonal terms

- simplest feedback is 2 bits (e.g., each $c_i$ has 1 bit)
  - if real($\alpha$) > 0, then $c_1$ = 1
    - otherwise, $c_1$ = −1
  - if real($\beta$) > 0, then $c_2$ = 1
    - otherwise, $c_2$ = −1

- diversity gain maximization (e.g., for 4 × 1 STBC [and/or SFBC])

- for 6 × 1 STBC [and/or SFBC], summation (Σ) of equation (1) [e.g., of FIG. 26] becomes:

$$\Sigma = \sum_i |h_i|^2 + 2\sum_{j=1}^{2} \left( \Re(c_{1j}\alpha_j) + \Re(c_{2j}\beta_j) + \Re(c_{1j}^* c_{2j}\gamma_j) \right)$$

where $\alpha_j = h_j^* h_{j+2}$, $\beta_j = h_j^* h_{j+4}$, $\gamma_j = h_{j+2}^* h_{j+4}$

- diversity gain maximization (e.g., for 6 × 1 STBC [and/or SFBC])

- for co-phase 3 × 1 STBC and/or SFBC, c can be selected to maximize the diagonal terms:

$$H_{sq} = H^*H = \begin{bmatrix} \Sigma & 0 \\ 0 & \Sigma \end{bmatrix} \quad \text{Eq. (2)}$$

$\Sigma = |h_1 + c_1 h_3|^2 + |h_2|^2 = \sum_i |h_i|^2 + [(c_1 h_1^* h_3 + c_1^* h_1 h_3^*)]$ $= \sum_i |h_i|^2 + 2\Re(c_1 \alpha^*)$ where $\alpha^* = h_1^* h_3$, and $\Re$ denotes "real part"

Then, choose $c_1 = \exp(j\theta_1)$ with the angles $\theta_1 = angle(\alpha)$ to maximize the diagonal terms

- simplest feedback is 1 bit
- if real($\alpha$) > 0, then $c_1 = 1$
  - otherwise, $c_1 = -1$

- diversity gain maximization (e.g., for 3 × 1 STBC [and/or SFBC])

FIG. 25

WIRELESS COMMUNICATION DEVICE WITH CONFIGURABLE SPATIAL TIME-FREQUENCY CODING AND METHODS FOR USE THEREWITH

CROSS REFERENCE TO RELATED PATENTS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:
1. U.S. Provisional Application Ser. No. 61/643,186, entitled CONFIGURABLE SPATIAL TIME-FREQUENCY CODING WITHIN SINGLE USER, MULTIPLE USER, MULTIPLE ACCESS, AND/OR MIMO WIRELESS COMMUNICATIONS, filed on May 4, 2012;
2. U.S. Provisional Application Ser. No. 61/646,210, entitled CO-PHASED SPACE TIME BLOCK CODING (STBC) AND/OR SPACE FREQUENCY BLOCK CODING (SFBC) WITHIN SINGLE USER, MULTIPLE USER, MULTIPLE ACCESS, AND/OR MIMO WIRELESS COMMUNICATIONS, filed May 11, 2012;
3. U.S. Provisional Application Ser. No. 61/660,299, entitled CO-PHASED SPACE TIME BLOCK CODING (STBC) AND/OR SPACE FREQUENCY BLOCK CODING (SFBC) WITHIN SINGLE USER, MULTIPLE USER, MULTIPLE ACCESS, AND/OR MIMO WIRELESS COMMUNICATIONS, filed Jun. 15, 2012; and
4. U.S. Provisional Application Ser. No. 61/769,500, entitled WIRELESS COMMUNICATION DEVICE WITH CONFIGURABLE SPATIAL TIME-FREQUENCY CODING AND METHODS FOR USE THEREWITH, filed Feb. 26, 2013.

BACKGROUND OF THE INVENTION

1. Technical Field of the Invention

The invention relates generally to communication systems; and, more particularly, it relates to selective coding within single user, multiple user, multiple access, and/or MIMO wireless communications.

2. Description of Related Art

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

The disadvantages of conventional approaches will be evident to one skilled in the art when presented the disclosure that follows.

BRIEF DESCRIPTION OF THE SEVERAL VIEWS OF THE DRAWINGS

FIG. 8 illustrates an embodiment of a feedback scheme.

FIG. 20 illustrates an embodiment of diversity gain maximization for STBC and/or SFBC in accordance with 4×1 signaling.

FIG. 22 illustrates an embodiment of diversity gain maximization for STBC and/or SFBC in accordance with 6×1 signaling.

FIG. 25 illustrates an embodiment of diversity gain maximization for co-phased STBC and/or SFBC in accordance with 3×1 signaling.

DETAILED DESCRIPTION OF THE INVENTION

Figure 1:
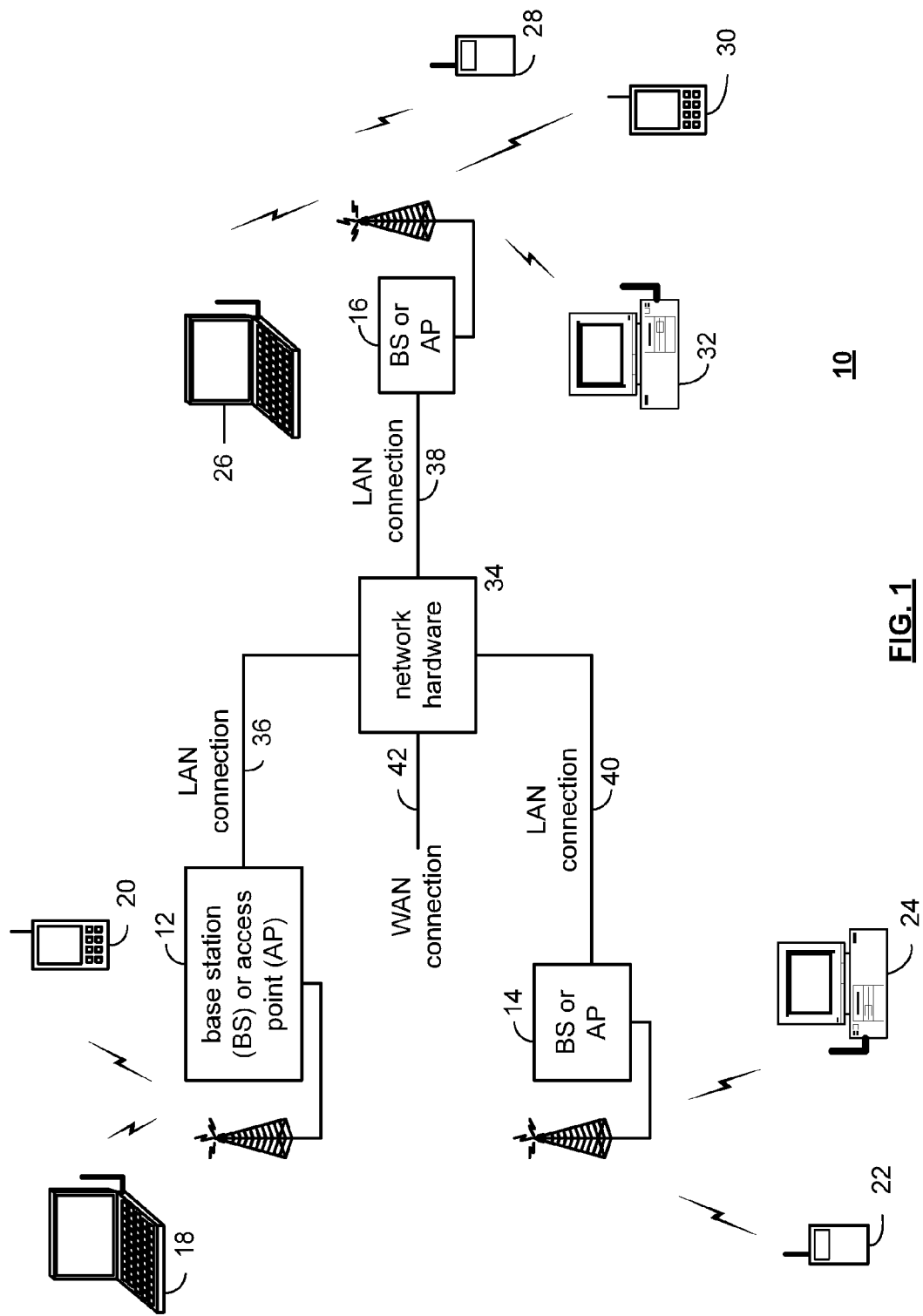
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
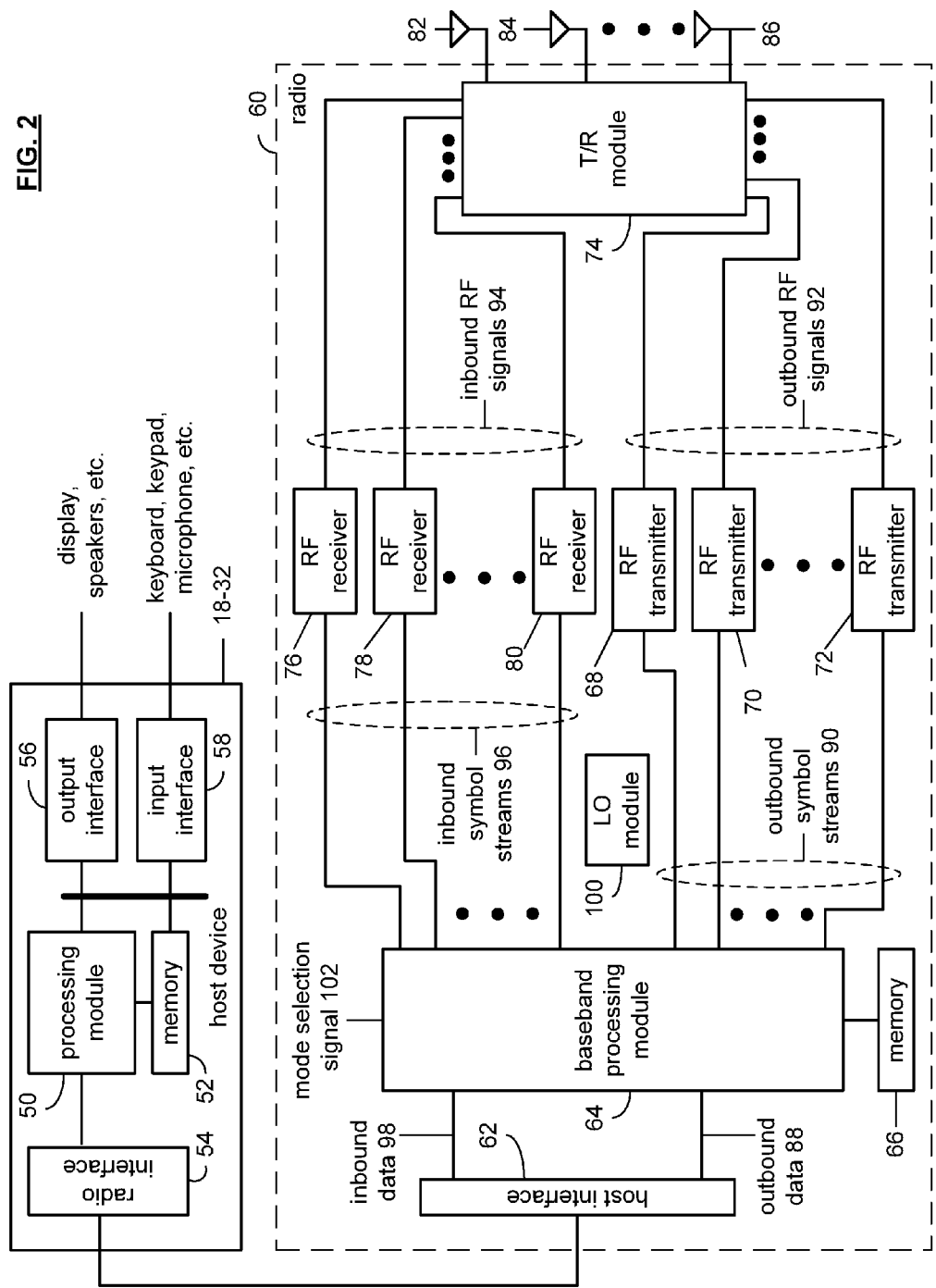
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. In operation, the radio 60 receives outbound data 88 from the host device via the host interface 62. The baseband processing module 64 receives the outbound data 88 and, based on a mode selection signal 102, produces one or more outbound symbol streams 90.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received. The baseband processing module 64 receives the inbound symbol streams

90 and converts them into inbound data 98, which is provided to the host device 18-32 via the host interface 62.

Figure 3:
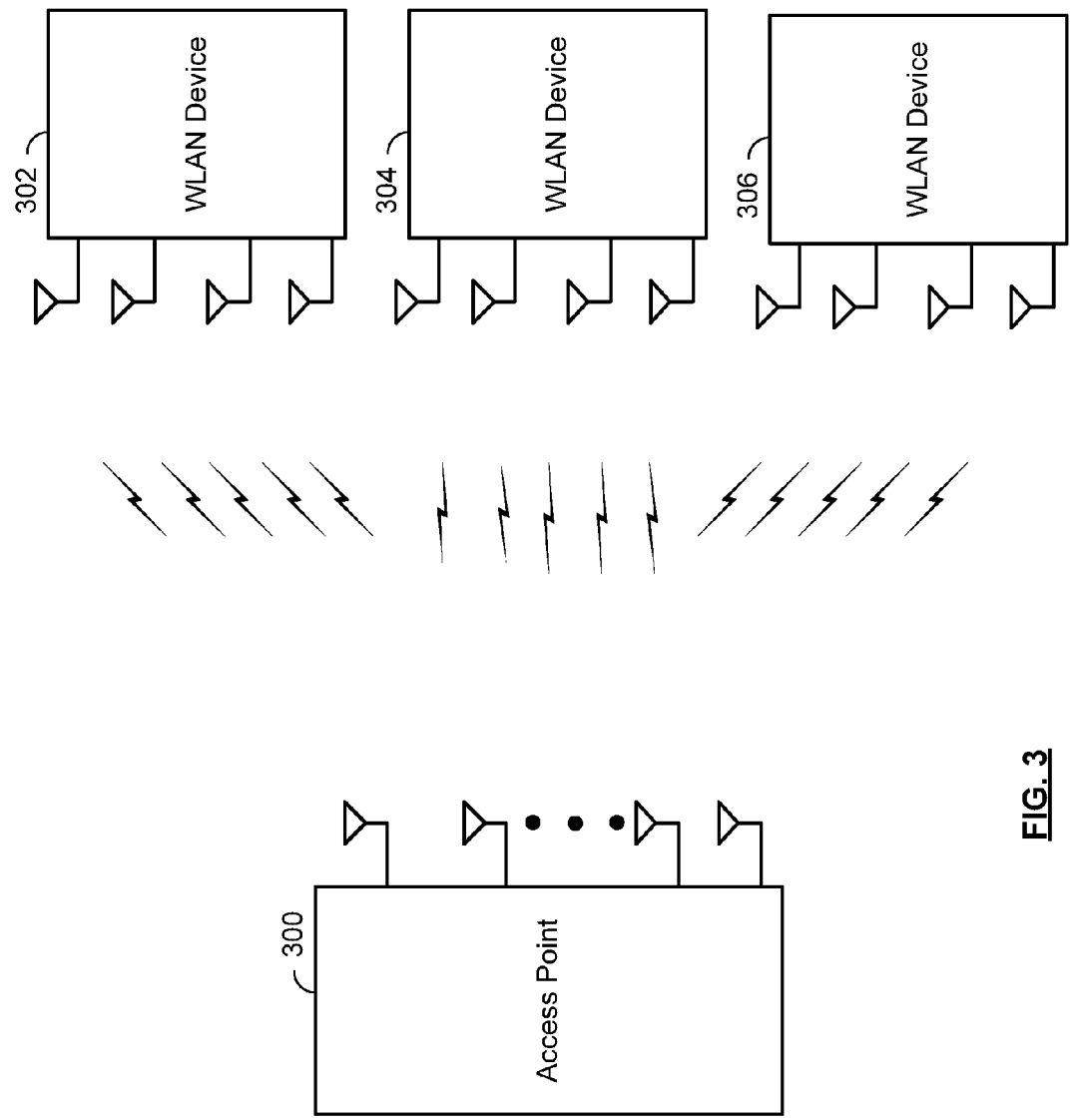
FIG. 3 is a diagram illustrating an embodiment of an access point (AP) and multiple wireless local area network (WLAN) devices operating according to one or more various aspects and/or embodiments of the invention.

FIG. 3 is a diagram illustrating an embodiment of an access point (AP) and multiple wireless local area network (WLAN) devices operating according to one or more various aspects and/or embodiments of the invention. The AP point 300 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 300 supports communications with the WLAN devices 302, 304, and 306 with channel bandwidths, MIMO dimensions, and at data throughput rates unsupported by the prior IEEE 802.11x operating standards. For example, the access point 300 and WLAN devices 302, 304, and 306 may support channel bandwidths from those of prior version devices and from 40 MHz to 1.28 GHz and above. The access point 300 and WLAN devices 302, 304, and 306 support MIMO dimensions to 4×4 and greater. With these characteristics, the access point 300 and WLAN devices 302, 304, and 306 may support data throughput rates to 1 GHz and above.

The AP 300 supports simultaneous communications with more than one of the WLAN devices 302, 304, and 306. Simultaneous communications may be serviced via OFDM tone allocations (e.g., certain number of OFDM tones in a given cluster), MIMO dimension multiplexing, or via other techniques. With some simultaneous communications, the AP 300 may allocate one or more of the multiple antennas thereof respectively to support communication with each WLAN device 302, 304, and 306, for example.

Further, the AP 300 and WLAN devices 302, 304, and 306 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 4:
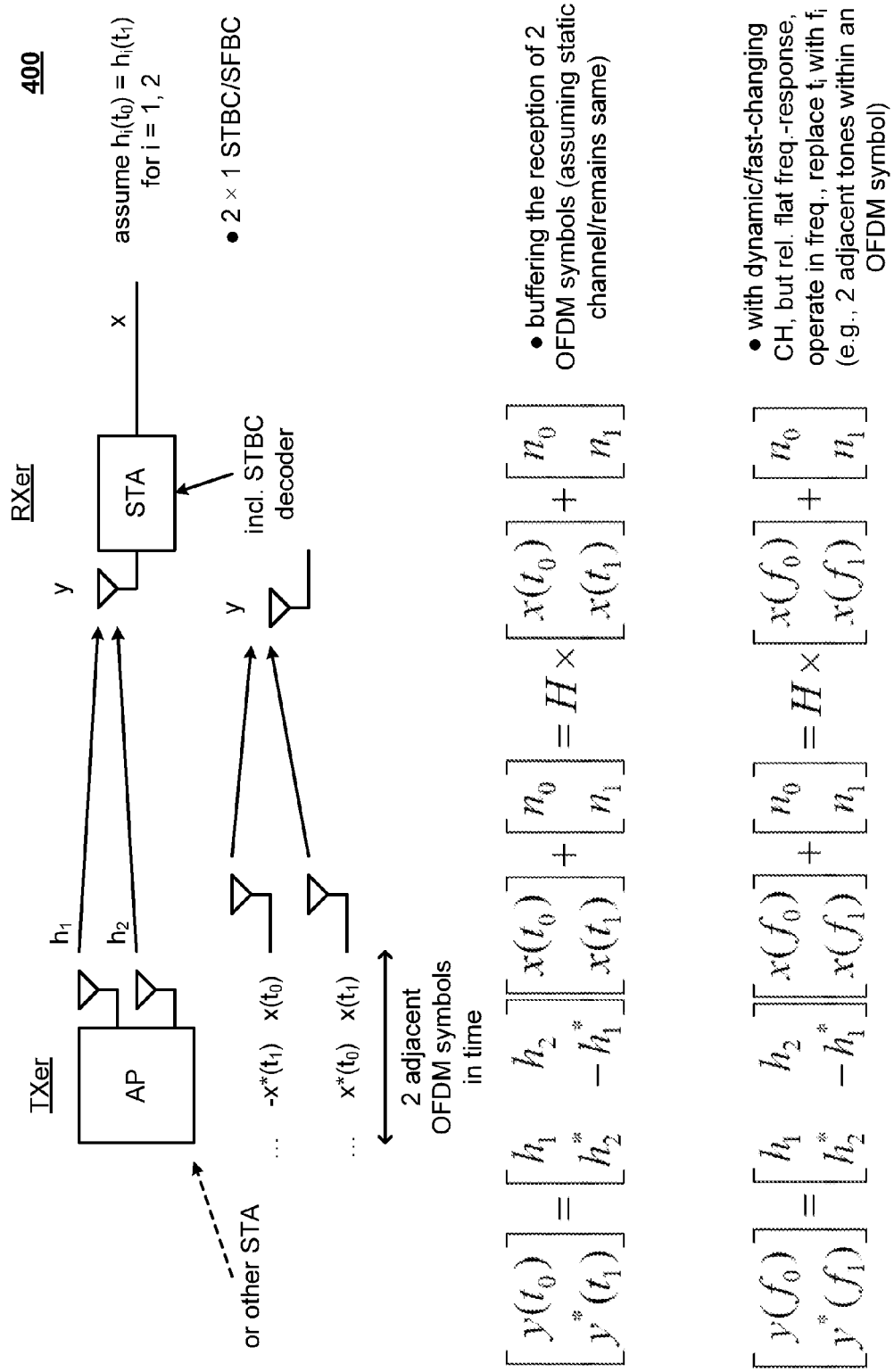
FIG. 4 illustrates an embodiment of 2×1 space time block coding (STBC) or space frequency block coding (SFBC).

FIG. 4 illustrates an embodiment 400 of 2×1 space time block coding (STBC) or space frequency block coding (SFBC). As may be seen with respect to this diagram, communications are supported between at least two respective communication devices. For example, one of the communication devices may be an access point (AP) and another of the communication devices may be a wireless station (STA). Alternatively, communications may be effectuated between two respective STA's. Generally speaking, such medications may be effectuated between two respective wireless communication capable communication devices.

In this diagram, 2 adjacent OFDM symbols in time are shown as being provided respectively to a plurality of transmit antennas. In this exemplary embodiment, the plurality of transmit antennas includes 2 transmit antennas, but it is of course noted that alternative embodiments could include more transmit antennas without departing from the scope and spirit of the invention. In addition, the respective paths (e.g., $h_1$ and $h_2$) between each of the transmit antennas and a receive antenna of a receiver communication device is assumed to be relatively static or relatively the same, at least with respect to the four instances or periods of time $t_1$ and $t_2$.

With respect to this diagram, selectivity between different respective operational modes is made in accordance with a transmitter communication device capable to perform 2×1 STBC and SFBC. By buffering the reception of two adjacent OFDM symbols, and assuming that the respective communication pathways (e.g., $h_1$ and $h_2$) to be relatively static or relatively the same, then signaling in accordance with STBC is shown approximately in the middle of the diagram. For example, if the communication channel does not change significantly as a function of time, then STBC signaling may be employed.

However, if the communication channel changes relatively quickly as a function of time, but has a relatively flat response over frequency, then SFBC signaling may alternatively be employed by replacing $t_i$ in STBC with $f_i$ to effectuate SFBC (e.g., 2 adjacent tones within and OFDM symbol).

As may be understood with respect to this diagram, depending upon at least one characteristic associated with the communication channel between a transmitter application device and receiver communication device, selection of an appropriate coding mode may be made that is appropriately tailored and best suited for the current operational conditions.

Figure 5:
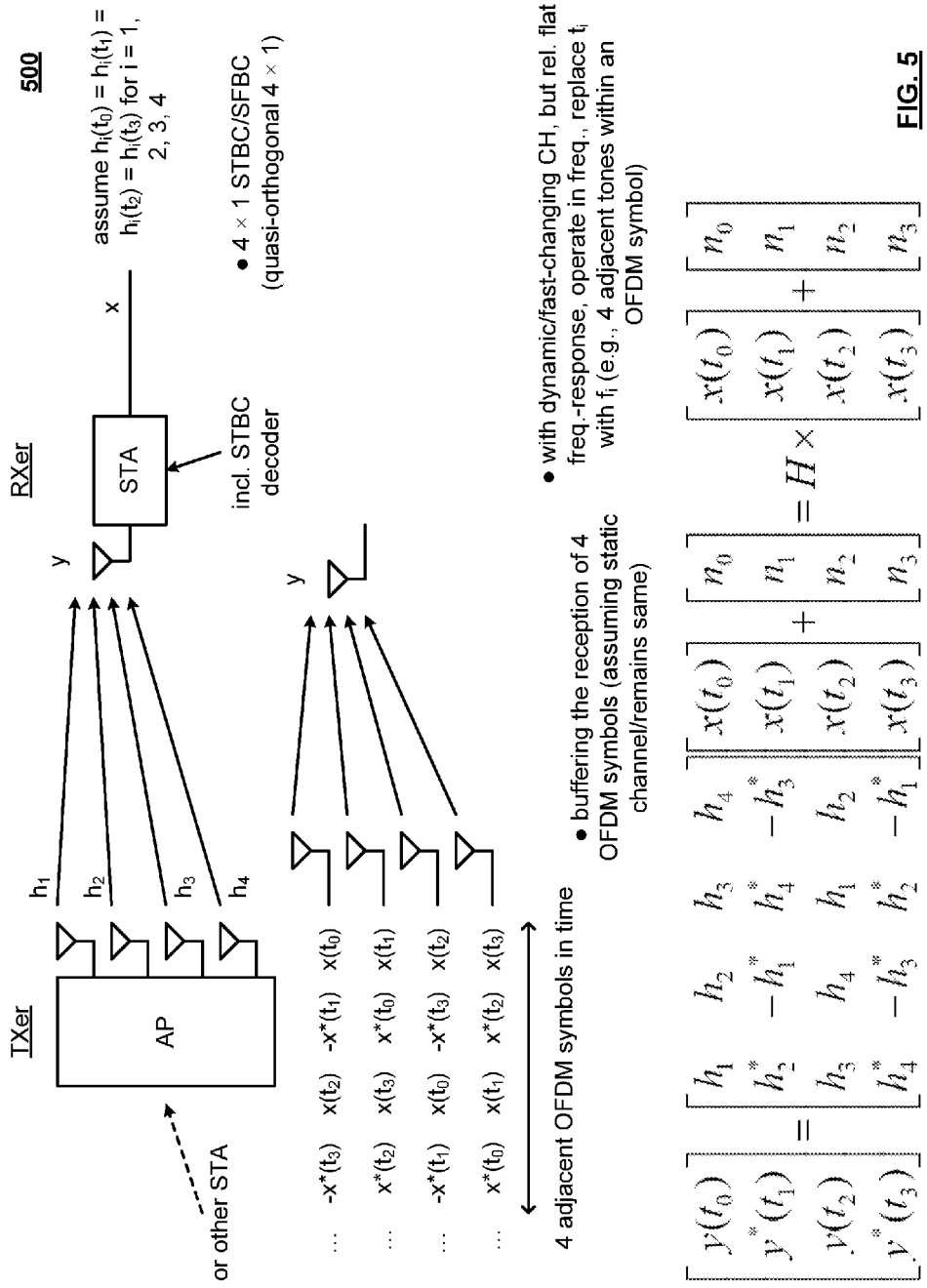
FIG. 5 illustrates an embodiment of 4×1 STBC or SFBC in accordance with quasi-orthogonal 4×1 signaling.

FIG. 5 illustrates an embodiment 500 of 4×1 STBC or SFBC in accordance with quasi-orthogonal 4×1 signaling. Also, with respect to this diagram, communications are supported between at least two respective communication devices. For example, one of the communication devices may be an access point (AP) and another of the communication devices may be a wireless station (STA). Alternatively, communications may be effectuated between two respective STA's. Generally speaking, such medications may be effectuated between two respective wireless communication capable communication devices.

In this diagram, 4 adjacent OFDM symbols in time are shown as being provided respectively to a plurality of transmit antennas. In this exemplary embodiment, the plurality of transmit antennas includes 4 transmit antennas, but it is of course noted that alternative embodiments could include more transmit antennas without departing from the scope and spirit of the invention. In addition, the respective paths (e.g., $h_1$ and $h_2$, $h_3$, and $h_4$) between each of the transmit antennas and a receive antenna of a receiver communication device is assumed to be relatively static or relatively the same, at least with respect to the four instances or periods of time $t_1$, $t_2$, $t_3$, and $t_4$.

Analogously as described with respect to other embodiments, depending upon at least one characteristic associated with the communication channel between a transmitter application device and receiver communication device, selection of an appropriate coding mode may be made that is appropriately tailored and best suited for the current operational conditions.

Figure 6:
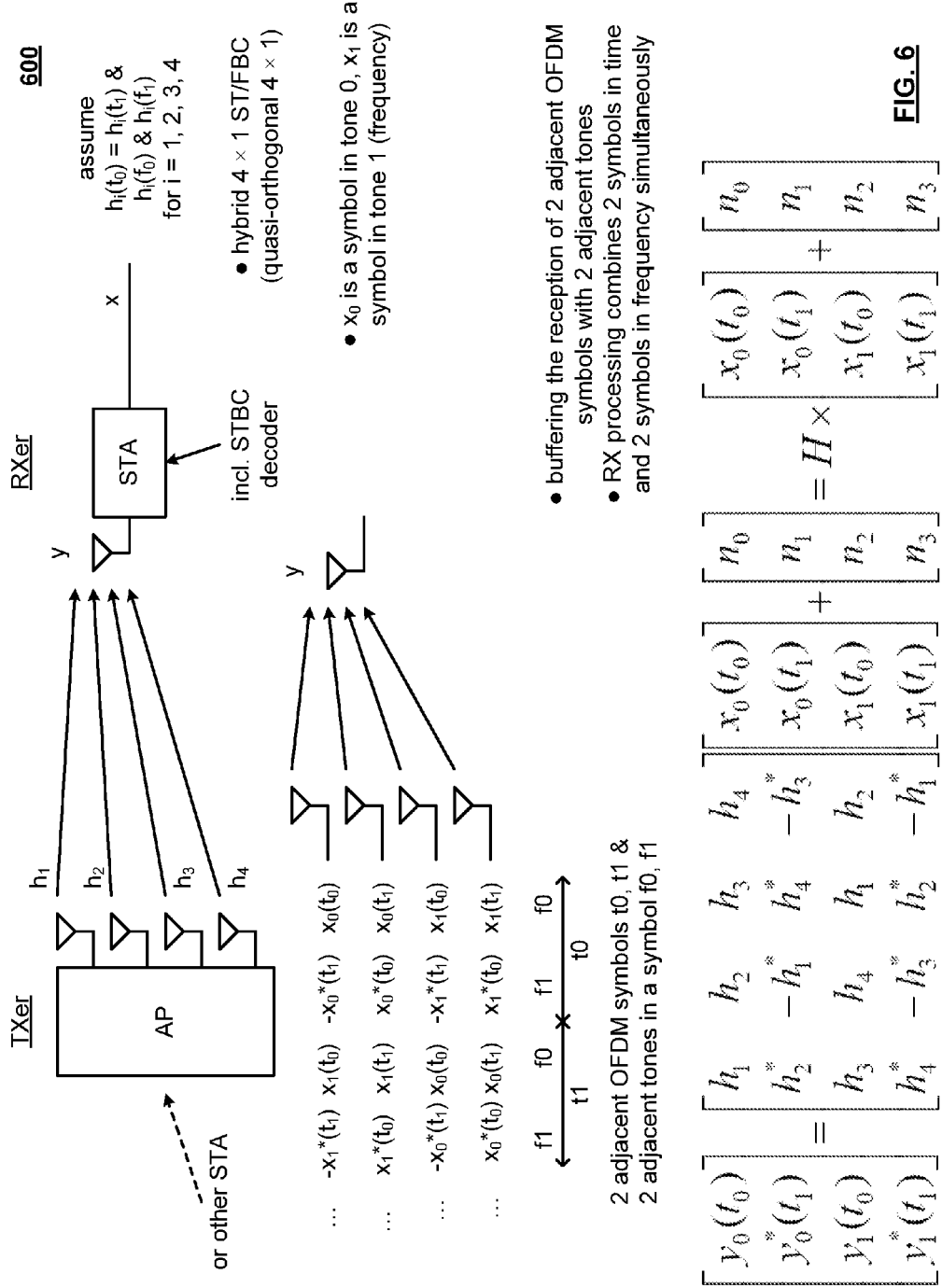
FIG. 6 illustrates an embodiment of hybrid space time/frequency block coding (ST/FBC) in accordance with quasi-orthogonal 4×1 signaling.

FIG. 6 illustrates an embodiment 600 of hybrid space time/frequency block coding (ST/FBC) in accordance with quasi-orthogonal 4×1 signaling. With respect to this diagram, four different symbols may be implemented over two respective time snapshots and over two respective tone snapshots. For example, considering the two respective times, t0 and t1, the respective tones, f0 and f1, are shown correspondingly at the left middle portion of the diagram.

For example, two adjacent OFDM symbols t0, t1 and two adjacent tones in a symbol f0, f1 may be employed for effectuating not only spatial coding but also time and frequency coding. By buffering the reception of two adjacent OFDM symbols with two adjacent tones, a receiver communication device may be implemented to combine two symbols in time and two symbols in frequency (e.g., in tones) simultaneously. Operation in accordance with this coding scheme may be made when the channel response is somewhere in between a slowly fading channel and a less than flat frequency response. That is to say, selection in accordance with this coding scheme may be made when neither STBC or SFBC alone would be a most optimal selection.

Figure 7:
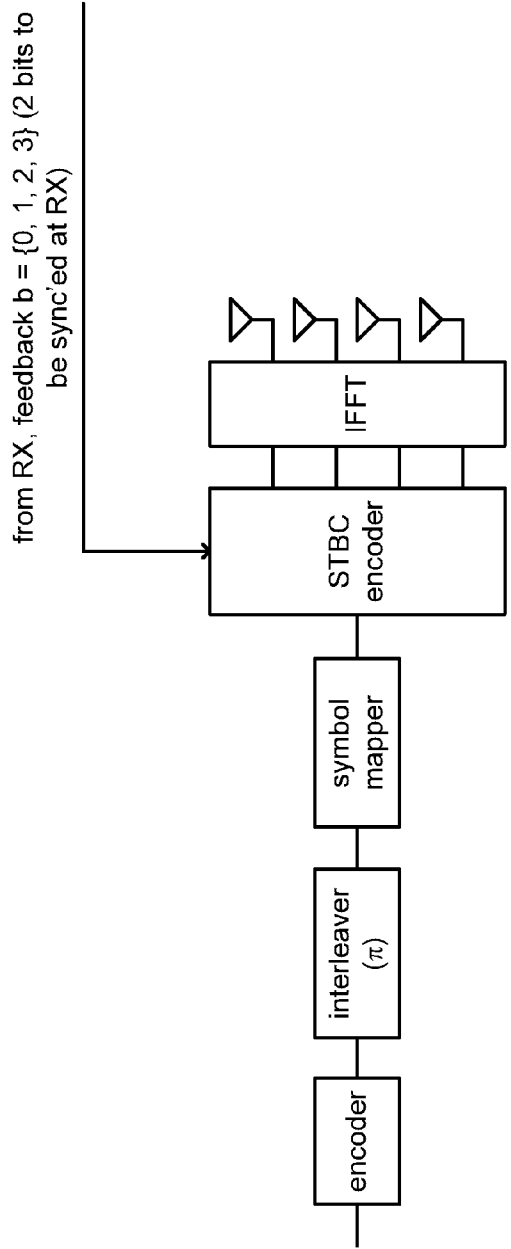
FIG. 7 illustrates an embodiment of a transmitter block diagram.

FIG. 7 illustrates an embodiment 700 of a transmitter block diagram. In particular, an RF transmitter such as RF transmitters (68-72) is shown of a communication device (transmitter or TX communication device) that is in communication with a remote communication device (receiver or RX communication device. In operation, a baseband processing module of the remote communication device, such as baseband processing module 64, generates a channel estimate of at least one communication pathway between the communication device and the remote communication device. The baseband processing module operates, based on the channel estimate to generate a feedback signal including a selected one of: space time block coding (STBC), space frequency block coding (SFBC), hybrid space time/frequency block coding (ST/FBC), and single stream multi-antenna spatial mapping. The RF transmitter of the remote communication device (68-72) transmits the feedback signal to the communication device. The receiver of the communication device, such as RF receiver (76-80), receives the feedback signal. The transmitter of the communication device selects a coding, based on the feedback signal, as one of: space time block coding (STBC), space frequency block coding (SFBC), hybrid space time/frequency block coding (ST/FBC), and single stream multi-antenna spatial mapping. In response, the transmitter generates a transmit signal in accordance with the selected coding and transmits the transmit signal to a remote communication device via a plurality of antennas.

In this example, an encoder is implemented to encode at least one information bit to generate an encoded bitstream. An interleaver ($\pi$) operates on the encoded bitstream, and a symbol mapper processes the output from the interleaver to provide a signal to and STBC encoder. The STBC encoder may be viewed as being an adaptive and/or configurable encoder operational in accordance with a number of respective operational encoding modes. For example, in one preferred embodiment, the output from the STBC encoder is space time block coding (STBC), space frequency block coding (SFBC), hybrid space time/frequency block coding (ST/FBC), or spatial mapping from one single stream to all of the respective transmit antennas.

As may be understood with respect to this diagram and others, while this exemplary embodiment includes 4 transmit antennas, different respective numbers of transmit antennas may alternatively be employed without departing from the scope and spirit of the invention.

The operation performed within the STBC encoder of a transmitter communication device may be made based upon feedback provided from a receiver communication device. For example, if 4 respective operational modes are employed, then the feedback may be composed of 2 bits such that any of the 4 respective operational modes may be indicated within the feedback signal. For example, the receiver communication device may be operative to measure the communication channel and to select the one coding scheme based on at least one characteristic associated with the channel.

FIG. 8 illustrates an embodiment 800 of a feedback scheme. In operation, a baseband processing module of a remote communication device (receiver or RX communication device), such as baseband processing module 64, generates a feedback signal that selects a coding type based on a channel estimate of at least one communication pathway between the RX communication device and a TX communication device. For example, th baseband processing module operates, based on the channel estimate to generate a feedback signal including a selected one of: space time block coding (STBC), space frequency block coding (SFBC), hybrid space time/frequency block coding (ST/FBC), and single stream multi-antenna spatial mapping.

In various embodiments, different respective types of feedback may be employed. One example of criteria used to select one of the coding schemes is based upon the channel correlation (e.g., when $|h_i|=1$). For instance, different respective correlation functions may be employed. In this diagram, a first correlation over time, a second correlation over frequency, and a third correlation over both time and frequency (hybrid) may be employed for use in selecting the appropriate form of coding to be employed.

Also, a threshold (e.g., ensuring that the maximum of a, b, c, is less than some threshold d, where d is a design parameter between 0 and 1) may be employed to determine whether or not any of these spatial coding operational modes is to be employed at all. For example, when comparison according to such a constraint does not compare favorably, then no spatial coding may be performed at all; for example, no STBC may be selected in such an instance. Alternatively, when comparison to such a constraint does in fact compare favorably, then one of these spatial coding operational modes (e.g., in accordance with time, frequency, or both time and frequency) may be selected.

Generally speaking, upon measurement of at least one characteristic of the communication channel, a given communication device (e.g., a receiver communication device) will have information pertaining to any change, fluctuation, etc. of the communication channel over time and or frequency. The more the communication channel varies or fluctuates, then the more orthogonality may be broken in accordance with a spatial block coding structure. As may be understood, such loss of orthogonality may deleterious the affect performance and incur severe self-interference. As such, one communication device (e.g., a receiver communication device) may transmit a signal (e.g., a feedback packet including 2 bits in one embodiment allowing selection of any one of 4 possible operational modes) to another communication device (e.g., a transmitter communication device) indicating which operational mode is recommended.

If correlation measurement in time and/or frequency does not match a desired threshold effectively suitable to manage these spatial block orthogonality, then the communication device (e.g., a receiver communication device) may transmit a signal indicating that no STBC should be employed at all.

Generally speaking, an STBC coding structure maintains its orthogonality based upon the assumption of the same channel response in a spatial block. However, if there is in fact variability of the channel response in the spatial block, then reception of signals from self-interference may deleteriously affect performance. In a preferred embodiment, a communication device (e.g., a receiver communication device) may transmit a signal to another communication device (e.g., a transmitter communication device) indicating which operational mode is recommended.

Figure 9:
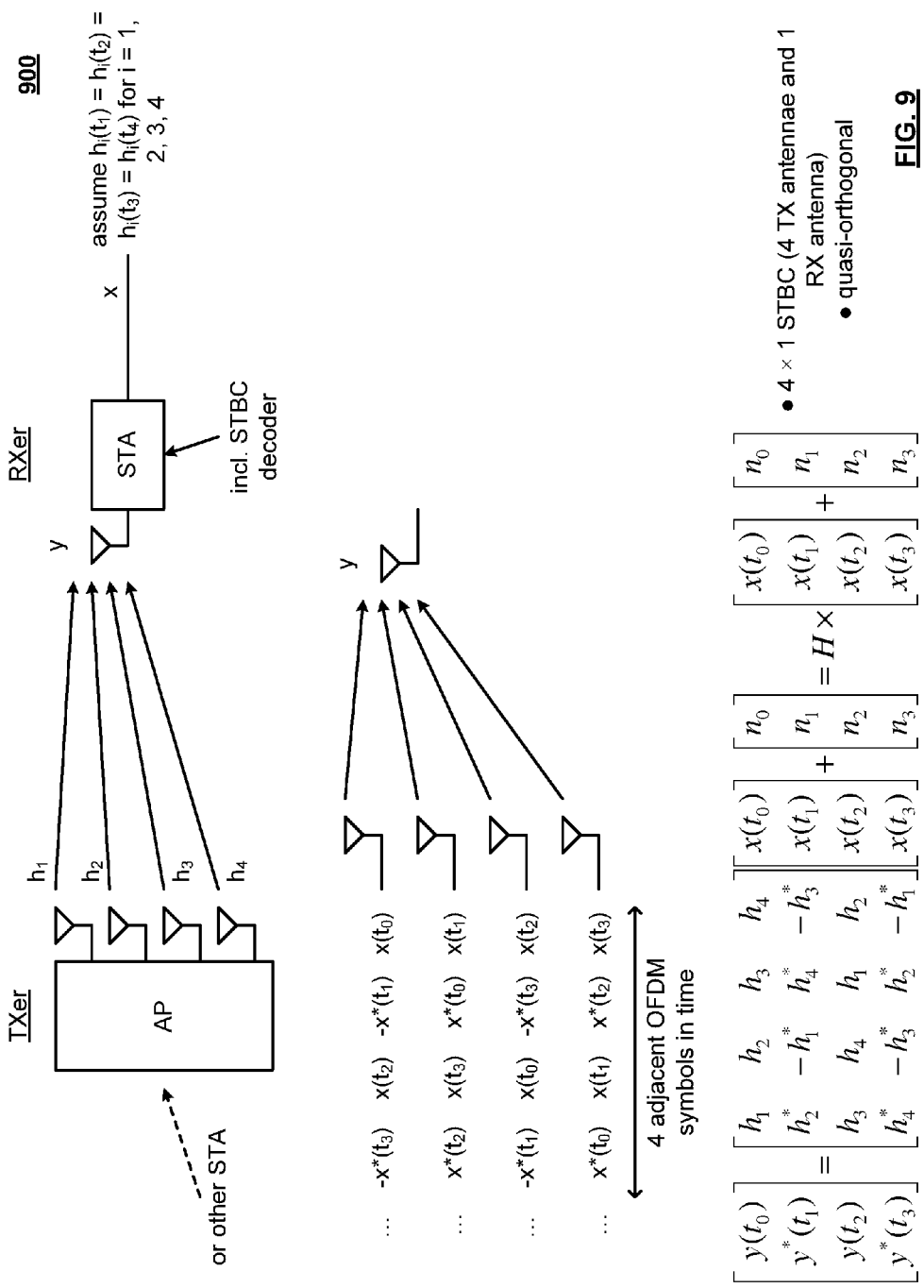
FIG. 9 illustrates an embodiment of data processing using 4×1 space time block coding (STBC) in a quasi-orthogonal manner.

FIG. 9 illustrates an embodiment 900 of data processing using 4×1 space time block coding (STBC) in a quasi-orthogonal manner. As may be seen with respect to this diagram, communications are supported between at least two respective communication devices. For example, one of the communication devices may be an access point (AP) and another of the communication devices may be a wireless station (STA). Alternatively, communications may be effectuated between two respective STA's. Generally speaking, such medications may be effectuated between two respective wireless communication capable communication devices.

In this diagram, 4 adjacent OFDM symbols in time are shown as being provided respectively to a plurality of transmit antennas. In this exemplary embodiment, the plurality of transmit antennas include 4 transmit antennas, but it is of course noted that alternative embodiments could include more transmit antennas without departing from the scope and spirit of the invention. In addition, the respective paths (e.g., $h_1$, $h_2$, $h_3$, and $h_4$) between each of the transmit antennas and a receive antenna of a receiver communication device is assumed to be relatively static or relatively the same, at least with respect to the four instances or periods of time $t_1$, $t_2$, $t_3$, and $t_4$.

In accordance with such operation, the original sequences are sent in odd numbered tones in accordance with OFDM signaling.

Figure 10:
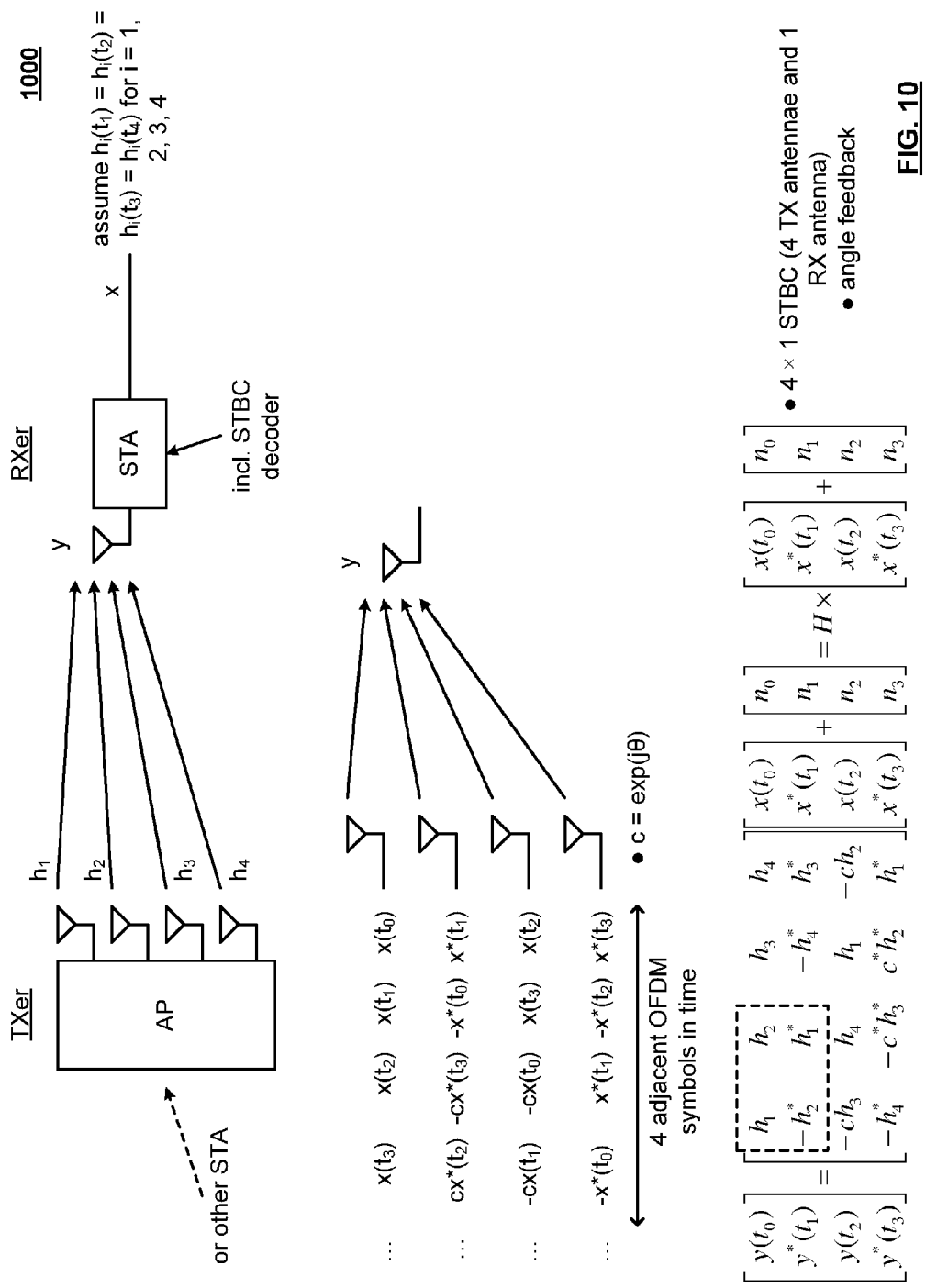
FIG. 10 illustrates an embodiment of data processing using 4×1 space time block coding (STBC) using angle feedback.

FIG. 10 illustrates an embodiment 1000 of data processing using 4×1 space time block coding (STBC) using angle feedback. With respect to this diagram, a first antennas (e.g., an antenna 1), such as that corresponding to a first one of the respective communication paths, $h_1$, sends the original sequence as if it is a single-output-single-input (SISO) communication system. The other of the respective antennas (e.g., antennas 2, 3, and 4) sender the conjugate/reordered signal all of the time with an appropriate phase rotation associated with c (e.g., phase rotation associated with plus or minus c, where $c=\exp(j\theta)$).

Figure 11:
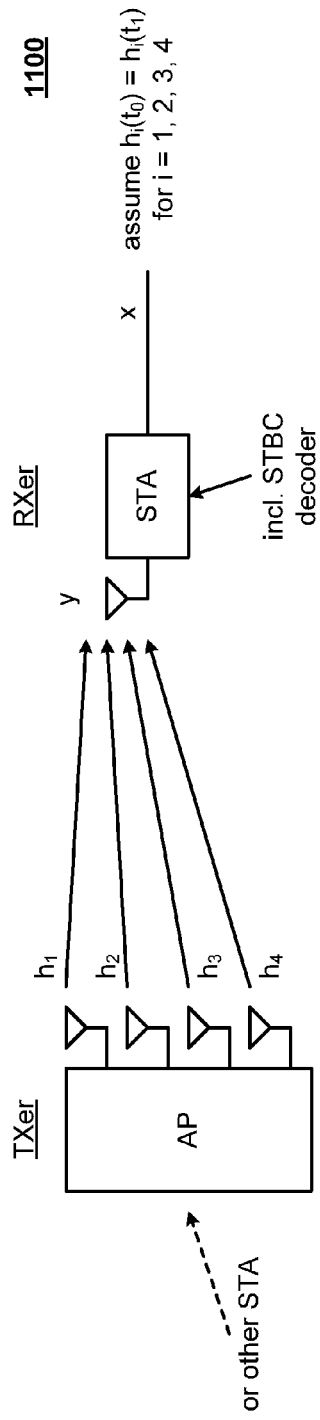
FIG. 11 illustrates an embodiment of crosstalk reduction for 4×1 STBC.

FIG. 11 illustrates an embodiment 1100 of crosstalk reduction for 4×1 STBC. For a 4×1 STBC, this phase rotation, c, can be appropriately chosen to minimize off diagonal terms in the matrix as shown within the diagram. If desired, the simplest form of feedback may be effectuated via one singular bit.

Figure 12:
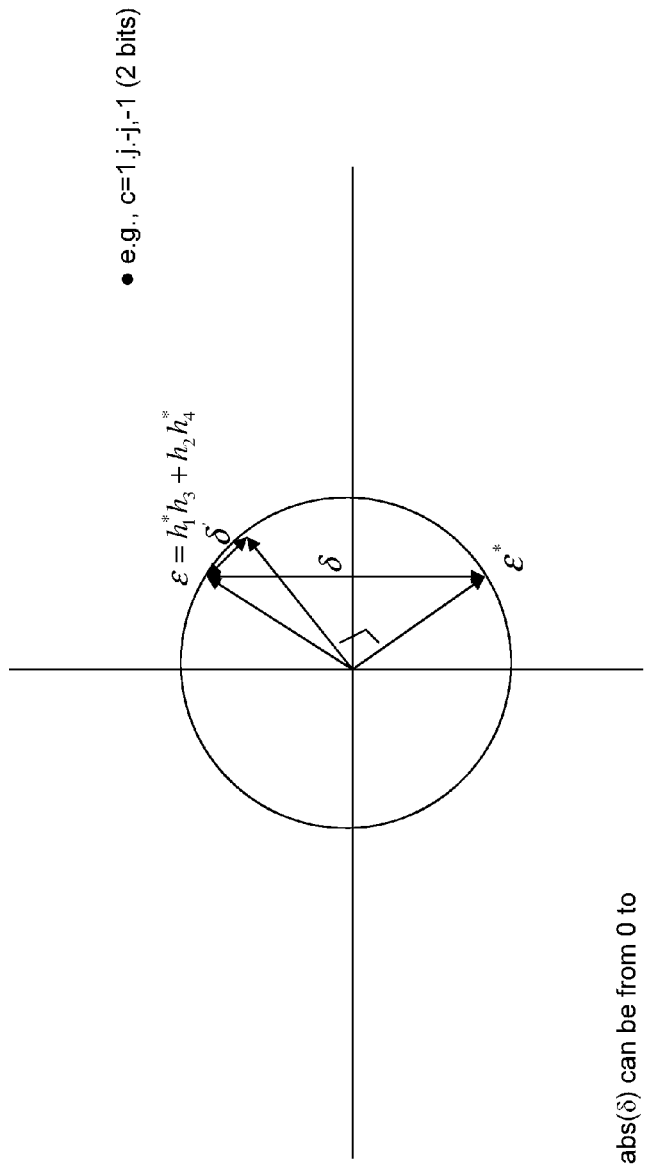
FIG. 12 illustrates an embodiment of off-diagonal terms with rotation by a value of c (e.g., where $c=\exp(j\theta)$).

FIG. 12 illustrates an embodiment 1200 of off-diagonal terms with rotation by a value of c (e.g., where $c=\exp(j\theta)$). This diagram shows, generally, how much phase rotation may be effectuated. For example, $\delta$ shows the relative difference between $\epsilon$ and $\epsilon'$. As can be seen by the diagram, after effectuating an appropriate rotation by the value, c, there is a significantly much smaller $\delta'$ (e.g., a modified $\delta$). Generally speaking, in accordance with such appropriate rotation, the magnitude of $\delta$ may reduce significantly.

Figure 13:
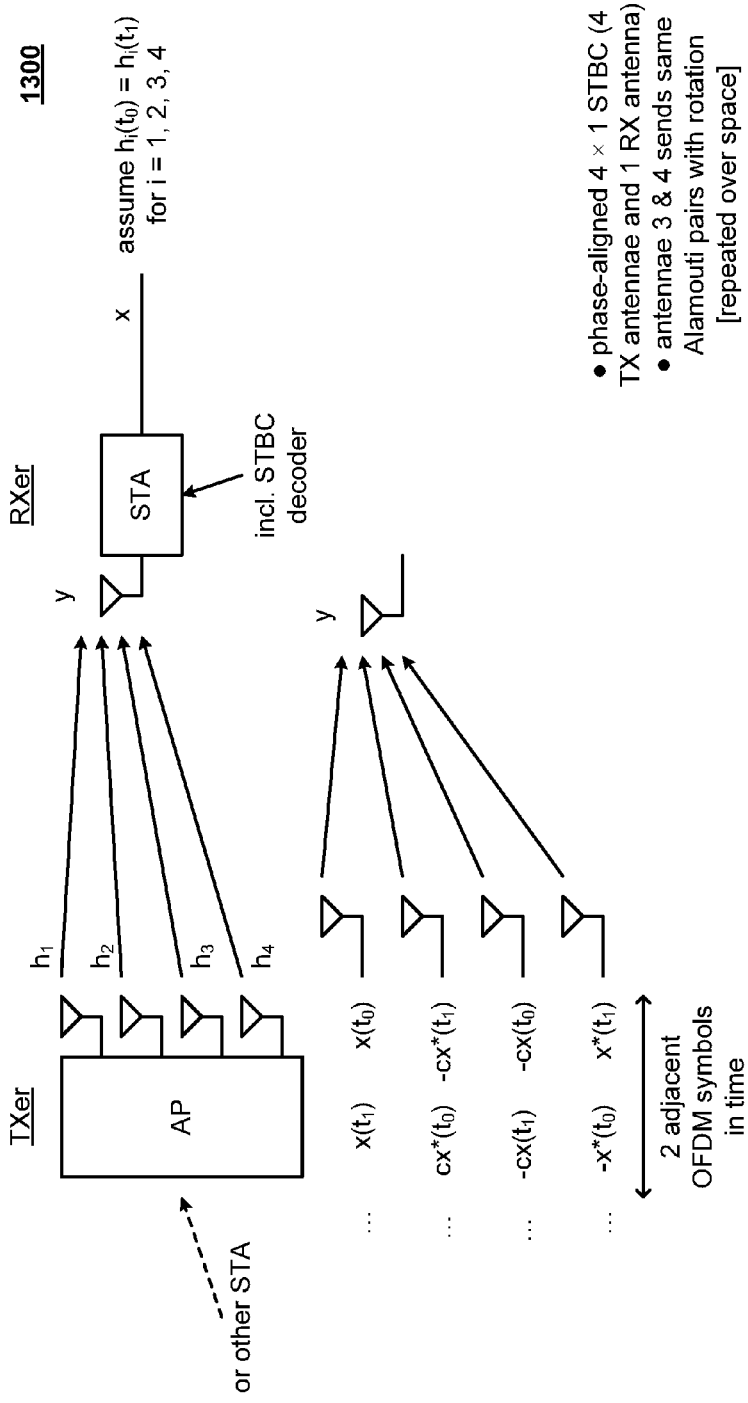
FIG. 13 illustrates an embodiment of data processing using phase-aligned 4×1 STBC.

FIG. 13 illustrates an embodiment 1300 of data processing using phase-aligned 4×1 STBC. Generally speaking, while certain exemplary embodiments depicted herein illustrate the use of four respective transmit antennas, it is of course noted that different respective numbers of transmit antennas may alternatively be employed without departing from the scope and spirit of the invention.

In accordance with communications within such wireless communication systems, communications may be effectuated in accordance with space time block coding (STBC). When operating using Alamouti pairs (2Ns×Ns), where Ns is the number of streams, and 2Ns is the number of transmit antennas such that the number of transmit antennas may generally be understood to be twice the number of streams. When multiple respective transmit antennas are available (e.g., 4 respective transmit antennas are available), those respective transmit antennas may be employed for a single stream. Herein, a novel approach is presented by which STBC may be employed allowing for a similar constraint of Alamouti pairs (e.g., multiple of 2 OFDM symbols). For example, a modified STBC may be employed operating in accordance with a similar constraint of Alamouti pairs.

As may be seen with respect to this diagram showing an exemplary embodiment, 2 respective adjacent OFDM symbols are transmitted in accordance with Alamouti pairs over 4 respective transmit antennas. As such, only 2 respective OFDM symbols need to be buffered.

Considering this embodiment with 4 respective transmit antennas, the antennas 3 and 4 sends the same Alamouti pairs with rotation (e.g., repeated over space). The second Alamouti pair is rotated to be phase-aligned with the first Alamouti pair. Generally speaking, a novel and modified STBC is generated in accordance with beamforming.

It is of course noted that more than 4 respective transmit antennas may be employed, and the principle of operating in accordance with the constraint of Alamouti pairs (e.g., multiple of 2 OFDM symbols) may be performed thereby.

Figure 14:
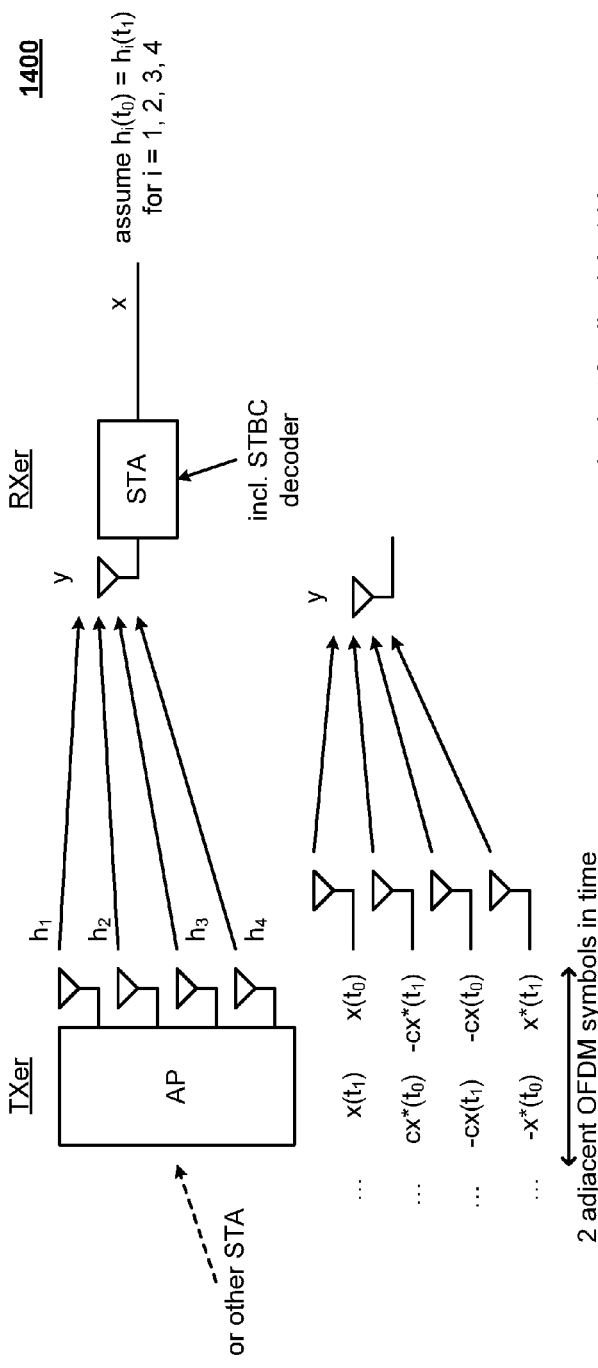
FIG. 14 illustrates an embodiment of diversity gain maximization for phase-aligned 4×1 STBC.

FIG. 14 illustrates an embodiment 1400 of diversity gain maximization for phase-aligned 4×1 STBC. As may be seen with respect to this diagram, for such a phase-aligned 4×1 STBC, and appropriate selected rotation, c, may be made in order to maximize the diagonal terms within the matrix shown in the lower left portion of the diagram. Different respective forms a feedback may be provided, and a simplest form a feedback would include a singular bit.

Figure 15:
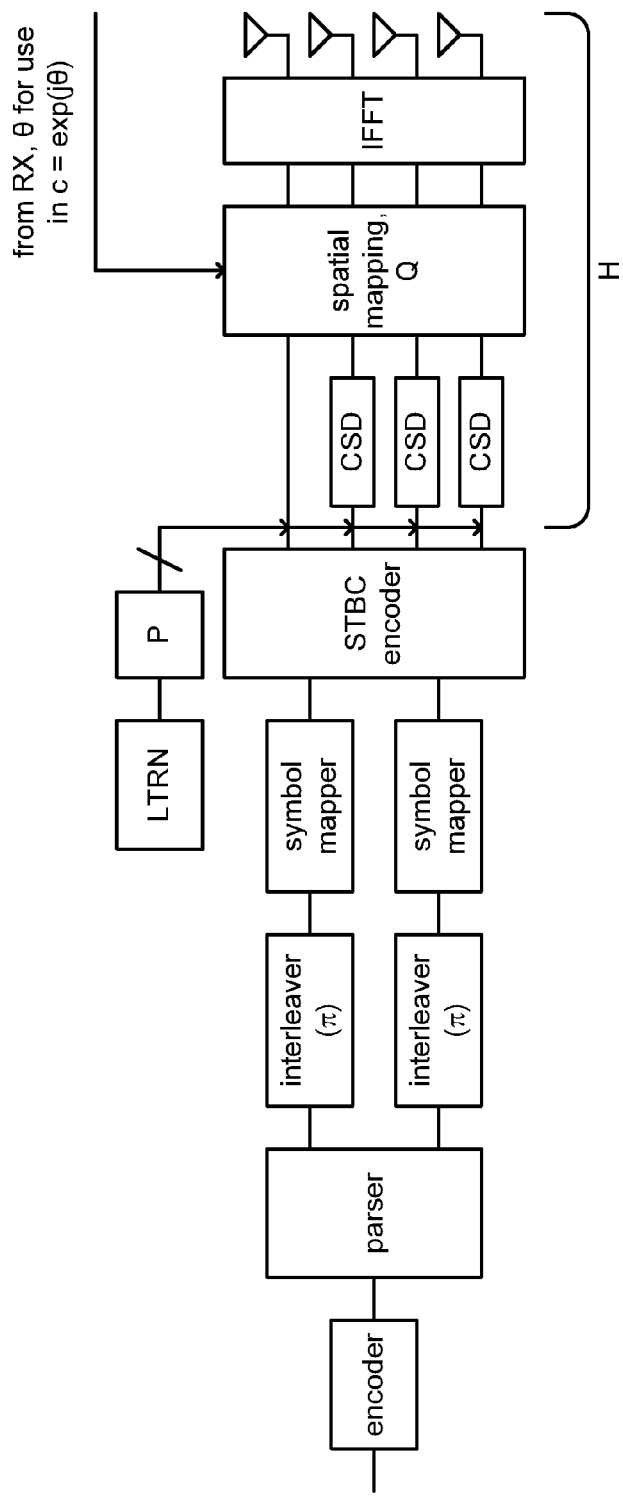
FIG. 15 illustrates an embodiment of a transmitter block diagram.

FIG. 15 illustrates an embodiment 1500 of a transmitter block diagram. This diagram shows a general embodiment by which a transmitter communication device may be implemented. An encoder operates to encode at least one information bit to generate an encoded bitstream that is provided to a parser that divides that encoded bitstream to be provided via two respective pathways. Each respective pathway includes a respective interleaver ($\pi$) and a symbol mapper. Thereafter, an STBC encoder operates to generate the respective streams to be transmitted via the plurality of respective pathways corresponding to the respective number of transmit antennas. At this point, a rotation matrix, P, may be employed to effectuate the appropriate vector mapping from a single stream to multiple respective streams corresponding to the number of transmit antennas.

As may be understood, the matrix, H, includes cyclic shift delay (CSD), Q (e.g., for beamforming [BF[) and channels over the air. LTRN (e.g., in accordance with binary phase shift keying (BPSK) modulation) is not encoded by STBC, nor by convolution coding. Again, CSD represents Cyclic Shift Delay (phase rotation in frequency domain), and Q is a steering matrix (for beamforming).

If desired, an appropriately added additional rotation, q, in Q matrix may be included as follows:

$$\begin{bmatrix} 1 & 0 \\ 0 & e^{j\theta} \\ -e^{j\theta} & 0 \\ 0 & -1 \end{bmatrix}$$

As may be understood, a novel approaches presented by which multiple respective transmit antennas may be employed for single-stream STBC. For example, in one possible implementation, 4 transmit antennas may be implemented in accordance with a single-stream STBC. Generally speaking, no respective changing frame format is required, and operation may be effectuated as using respective Alamouti pair operation with 2 Tx. For example, considering an embodiment including 4 transmit antennas, the operation may be effectuated as an Alamouti pair with 2 Tx.

Generally speaking, from the perspective of a transmitter communication device, the same signals may be repeated over space to achieve greater diversity gain. However, from the perspective of a receiver communities device, the decoding process would employ 2 OFDM symbol pairs as in 2 Tx STBC (e.g., however, such an embodiment may actually include 4 transmit antennas). In addition, there is no need for any extra zero valued bit padding to fill up the respective streams to achieve multiples of a particular number of a OFDM symbols (e.g., 4 respective audio symbols).

In certain embodiments, a feedback signal provided from a receiver communication device may be employed for effectuating the appropriate rotation of the repeated Alamouti pair. That is to say, a second Alamouti pair may be viewed as being a rotated and phase aligned version of a first Alamouti pair. If desired, the feedback signal provided from a receiver communication device may be used for generation of the second Alamouti pair based on the first Alamouti pair.

A similar sequence of null data packet (NDP) or null data packet announcement (NDP-A) may be employed. For example, such signaling as is used in accordance with beamforming feedback may be employed. For example, one bit in NDP-A may be used for indication of whether a sounding frame is for a closed loop 4 Tx single-stream STBC or beamforming. Feedback frames may be employed that are similar to beamforming feedback, but may have significantly less information contained therein (e.g., as few as one bit per tone in accordance with OFDM signaling, or even less overhead if grouping of feedback information is performed). The actual data transmission using the feedback information will however be transparent to a receiver communication device. That is to say, the receiver communication device need not know specifically whether or not the transmitter communication device applies the feedback angles or not for a single-stream STBC.

Using such phase alignment in accordance with STBC may provide for a significant performance gain over similarly implemented orthogonal STBC. In addition, such processing may be effectuated within a baseband processor thereby not requiring any hardware changes. Generally, such phase-aligned STBC processing operates to emulate multiple respective Alamouti pairs. Considering an embodiment with 4 transmit antennas, such phase-aligned STBC processing operates to emulate 2 respective Alamouti pairs such that a second Alamouti pair is phase rotated and aligned with respect to the first Alamouti pair. In addition, within embodiments including a form of feedback (e.g., 1 or 2 bits per tone), a significant savings in feedback overhead may be achieved when compared to traditional beamforming.

Figure 16:
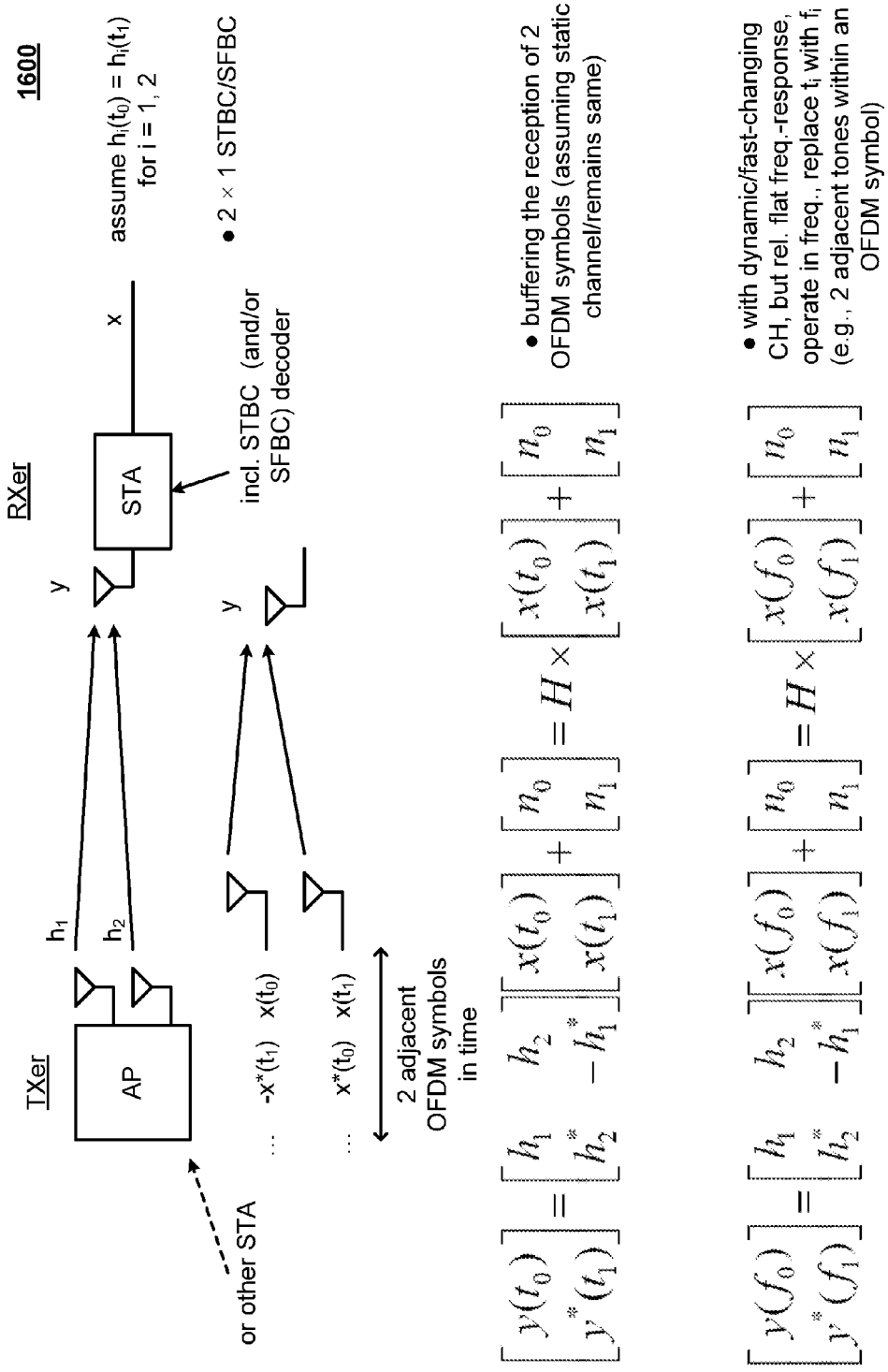
FIG. 16 illustrates an embodiment of 2×1 space time block coding (STBC) or space frequency block coding (SFBC).

FIG. 16 illustrates an embodiment 1600 of 2×1 space time block coding (STBC) or space frequency block coding (SFBC). As may be seen with respect to this diagram, communications are supported between at least two respective communication devices. In this diagram, 2 adjacent OFDM symbols in time are shown as being provided respectively to a plurality of transmit antennas. In this exemplary embodiment, the plurality of transmit antennas includes 2 transmit antennas, but it is of course noted that alternative embodiments could include more transmit antennas without departing from the scope and spirit of the invention. In addition, the respective paths (e.g., $h_1$ and $h_2$) between each of the transmit antennas and a receive antenna of a receiver communication device is assumed to be relatively static or relatively the same, at least with respect to the four instances or periods of time $t_1$ and $t_2$.

With respect to this diagram, selectivity between different respective operational modes is made in accordance with a transmitter communication device capable to perform 2×1 STBC and SFBC. By buffering the reception of two adjacent OFDM symbols, and assuming that the respective communication pathways (e.g., $h_1$ and $h_2$) to be relatively static or relatively the same, then signaling in accordance with STBC is shown approximately in the middle of the diagram. For example, if the communication channel does not change significantly as a function of time, then STBC signaling may be employed.

However, if the communication channel changes relatively quickly as a function of time, but has a relatively flat response over frequency, then SFBC signaling may alternatively be employed by replacing $t_i$ in STBC with $f_i$ to effectuate SFBC (e.g., 2 adjacent tones within and OFDM symbol).

Figure 17:
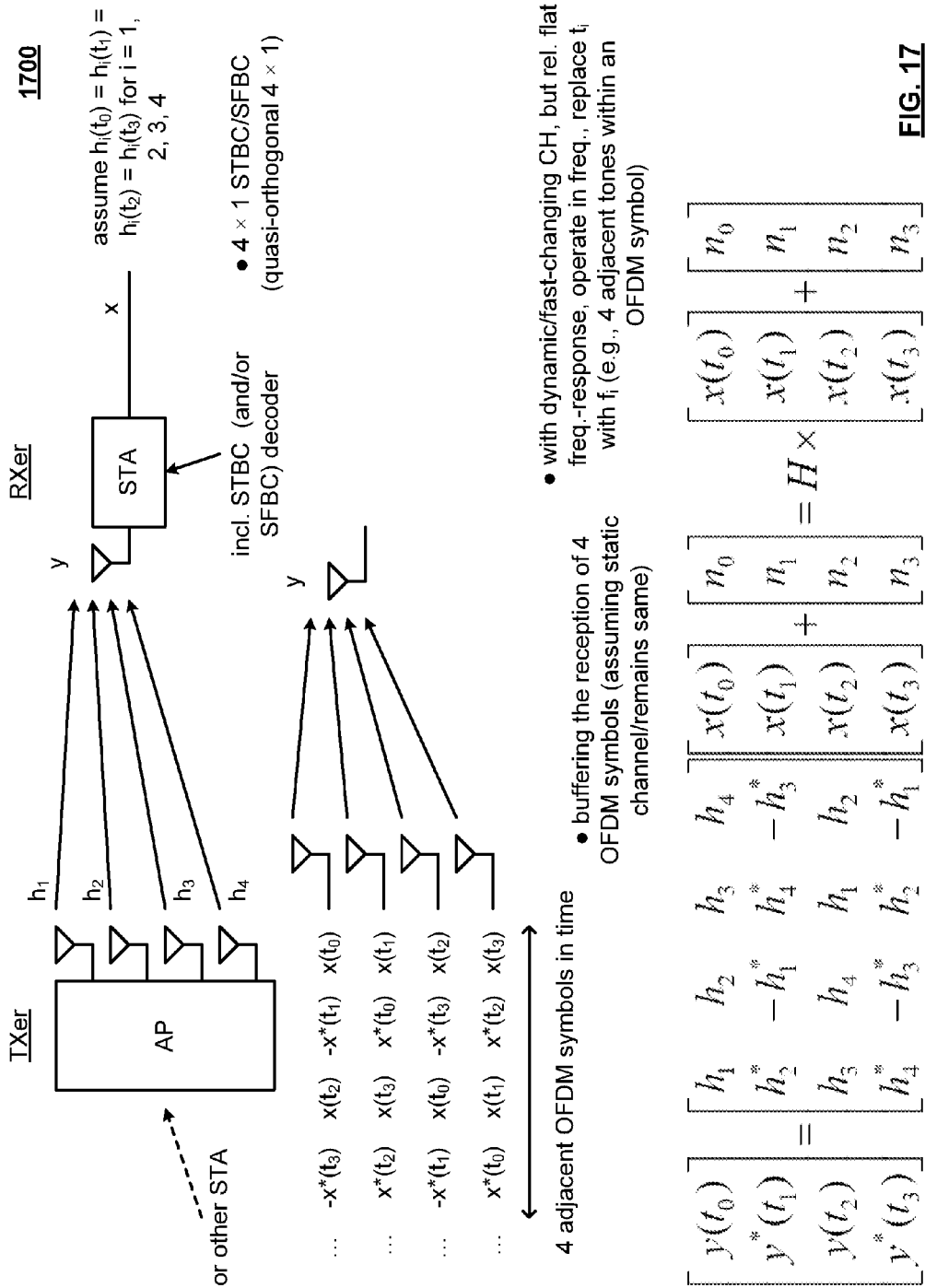
FIG. 17 illustrates an embodiment of 4×1 STBC or SFBC in accordance with quasi-orthogonal 4×1 signaling.

FIG. 17 illustrates an embodiment 1700 of 4×1 STBC or SFBC in accordance with quasi-orthogonal 4×1 signaling. Also, with respect to this diagram, communications are supported between at least two respective communication devices. For example, one of the communication devices may be an access point (AP) and another of the communication devices may be a wireless station (STA). Alternatively, communications may be effectuated between two respective STA's. Generally speaking, such medications may be effectuated between two respective wireless communication capable communication devices.

In this diagram, 4 adjacent OFDM symbols in time are shown as being provided respectively to a plurality of transmit antennas. In this exemplary embodiment, the plurality of transmit antennas includes 4 transmit antennas, but it is of course noted that alternative embodiments could include more transmit antennas without departing from the scope and spirit of the invention. In addition, the respective paths (e.g., $h_1$ and $h_2$, $h_3$, and $h_4$) between each of the transmit antennas and a receive antenna of a receiver communication device is assumed to be relatively static or relatively the same, at least with respect to the four instances or periods of time $t_1$, $t_2$, $t_3$, and $t_4$.

Analogously as described with respect to other embodiments, depending upon at least one characteristic associated with the communication channel between a transmitter application device and receiver communication device, selection of an appropriate coding mode may be made that is appropriately tailored and best suited for the current operational conditions.

Figure 18:
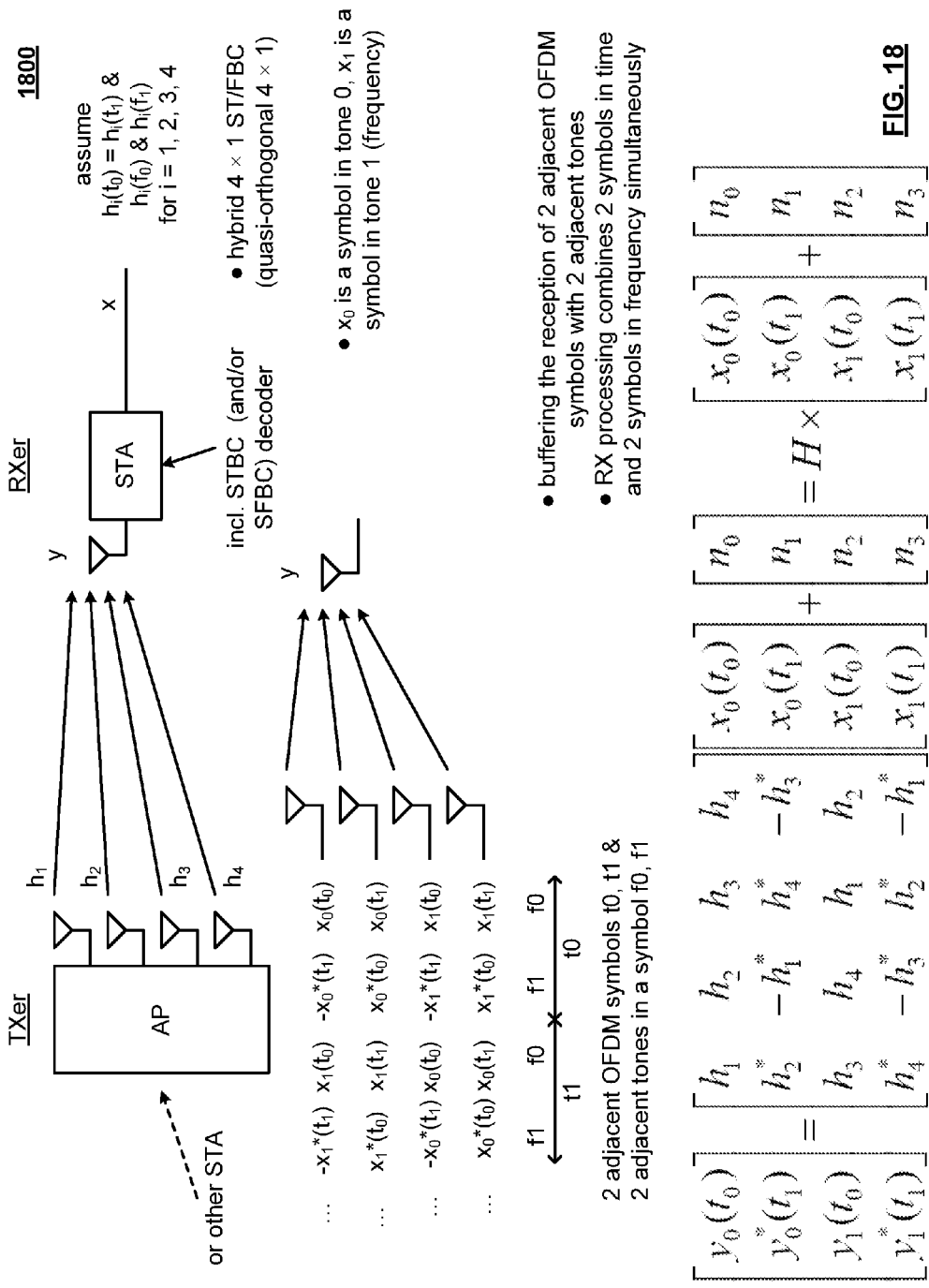
FIG. 18 illustrates an embodiment of hybrid space time/frequency block coding (ST/FBC) in accordance with quasi-orthogonal 4×1 signaling.

FIG. 18 illustrates an embodiment 1800 of hybrid space time/frequency block coding (ST/FBC) in accordance with quasi-orthogonal 4×1 signaling. With respect to this diagram, four different symbols may be implemented over two respective time snapshots and over two respective tone snapshots. For example, considering the two respective times, t0 and t1, the respective tones, f0 and f1, are shown correspondingly at the left middle portion of the diagram.

Figure 19:
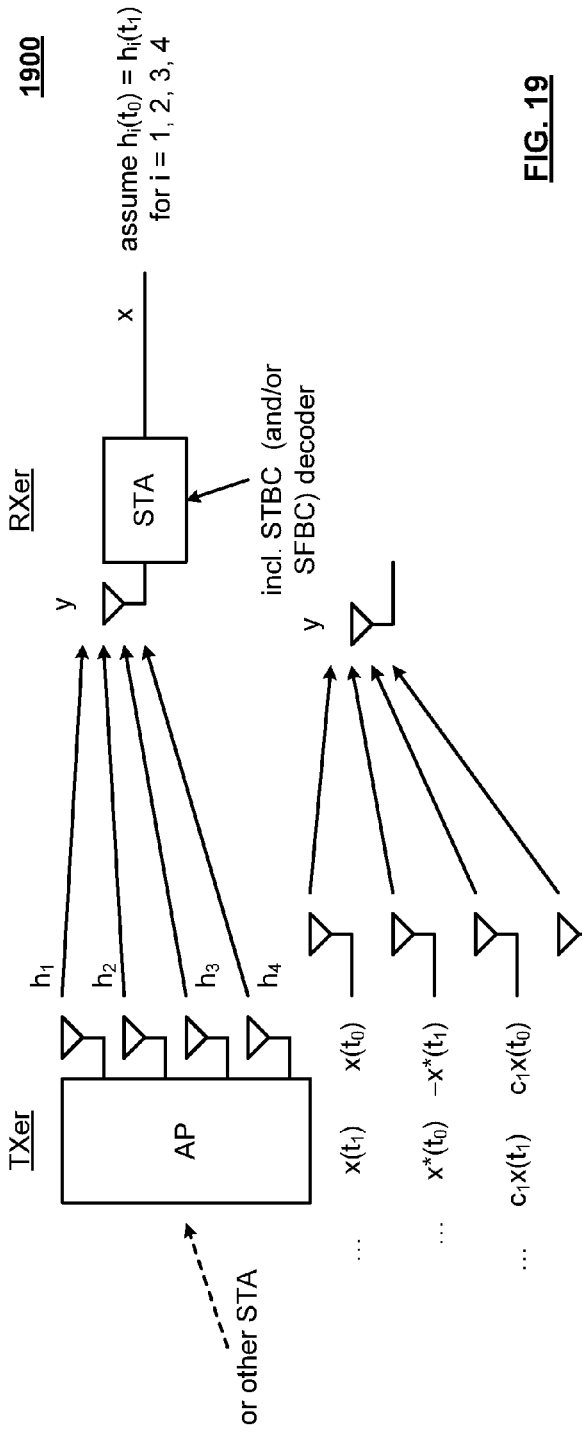
FIG. 19 illustrates an embodiment of co-phased STBC and/or SFBC in accordance with 4×1 signaling.

FIG. 19 illustrates an embodiment 1900 of co-phased STBC and/or SFBC in accordance with 4×1 signaling. As has been described herein, rotation may be performed with respect to different antennas within different respective Alamouti pairs may be performed. As may be seen with respect to this diagram, different respective rotation may be made with respect to the different individual antennas within a given Alamouti pair. That is to say, considering and Alamouti pair corresponding to two respective antennas, the signaling provided to each respective antenna within that particular Alamouti pair may in fact undergo a different respective rotation. For example, as may be seen with respect to this diagram that operates in accordance with 4×1 signaling, the antennas 3 and 4 may be operative to transmit the same Alamouti pairs with rotation (repeated over space). The second Alamouti pair may be viewed as being rotated to be phase aligned with the first Alamouti pair (e.g., from certain perspectives, and implementation of being formed STBC and/or SFBC). Generally speaking, while certain of the embodiments and/or diagrams illustrated herein may be viewed as being described with respect to STBC, the principles described herein may also be extended to SFBC (e.g., such as being applied to adjacent sub-carriers of an OFDM system) and/or a combination of STBC and SFBC (e.g., such as in accordance with hybrid ST/FBC described above or some other implemented combination of STBC and SFBC).

Generally speaking, as may be understood with respect to this diagram and or others employing co-phased STBC and/or SFBC, different respective rotational values may be separately employed with respect to each of the respective antennas associated with an Alamouti pair. That is to say, rather than using a singular phase rotation or value in accordance with one or more Alamouti pairs associated with a given mode of transmission, more than one phase rotation or value may be respectively employed for the different respective signals transmitted via different respective antennas within one or more Alamouti pairs.

FIG. 20 illustrates an embodiment 2000 of diversity gain maximization for STBC and/or SFBC in accordance with 4×1 signaling. As may be seen with respect to this diagram, for co-phase 4×1 STBC and/or SFBC, appropriately selected values for rotation may be made to maximize the diagonal terms associated with equation 1. Again, as may be understood with respect to certain embodiments and/or diagrams herein, more than one phase rotation or value may be respectively employed for the different respective signals transmitted via different respective antennas within one or more Alamouti pairs. As such, different respective of values may be used for respectively rotating different signal portions associated with different antennas of one or more Alamouti pairs.

With respect to feedback provided from a receiver communication device to a transmitter communication device, the relatively simplest feedback may be composed of 2 bits (e.g., each respective $c_i$ having feedback associated with 1 of the respective bits). For example, if the real portion associated with one of the respective values, $\alpha$ or $\beta$, is greater than zero, then the feedback bit associated with that value may be set to 1; otherwise, the feedback bit associated with that value may be set to −1.

Generally speaking, the different respective values, $\alpha$ or $\beta$, may be separated out to allow for more effective fine-tuning of the real portion of signaling transmitted via the respective antennas. That is to say, as a function of the inner product of the H matrix, individual and respective rotation of the elements may be performed therein. As such, increased gain may be achieved by individually and selectively rotating the different respective signal portions transmitted via different respective antennas, such as within one or more Alamouti pairs.

Figure 21:
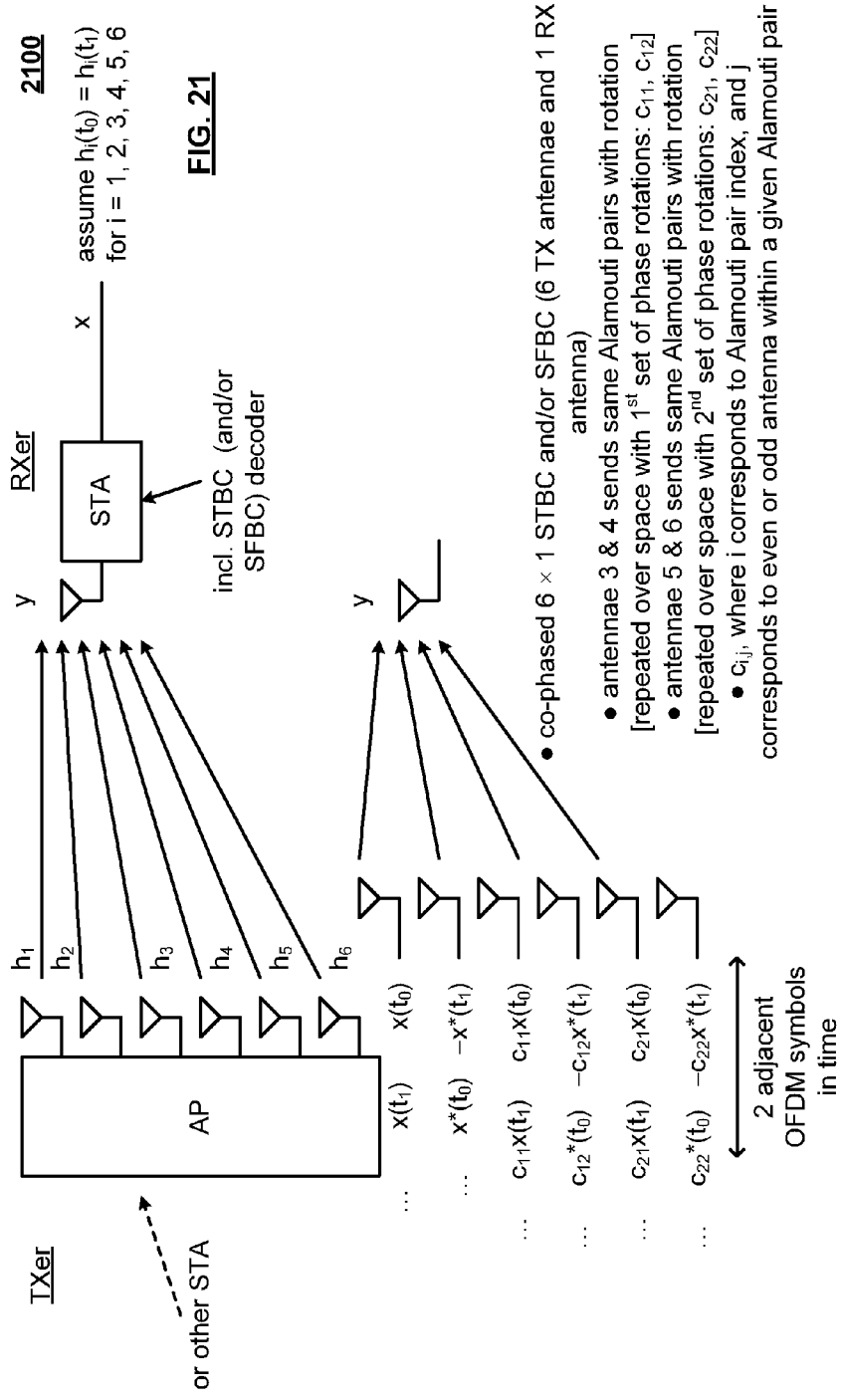
FIG. 21 illustrates an embodiment of co-phased STBC and/or SFBC in accordance with 6×1 signaling.

FIG. 21 illustrates an embodiment 2100 of co-phased STBC and/or SFBC in accordance with 6×1 signaling. As may be seen with respect to this diagram which includes more transmit antennas within a transmitter communication device than that included within the prior embodiment 2500 FIG. 25, there are two additional Alamouti pairs that are transmitted. As such, to effectuate differentiation between respective Alamouti pairs, a double valued subscript is employed for the phase rotations respectively provided via the use additional Alamouti pairs. Generally speaking, for a given rotation value, $c_{i,j}$, the value of i corresponds to the additional Alamouti pair index, and the value of j corresponds to the particular antenna (e.g., even or odd antenna) within a given Alamouti pair. For example, the value of $c_{1,1}$ corresponds to the first Alamouti pair index and the first antenna within that particular Alamouti pair, while the value of $c_{1,2}$ corresponds also to that first Alamouti pair index but instead corresponds to the second antennas within a particular Alamouti pair.

As may be seen with respect to this diagram that includes 6 respective transmit antennas and operate in accordance with 6×1 signaling, there are three respective variables, $\alpha$, $\beta$, and $\gamma$. As such, there are eight respective choices respect to this embodiment 2700. Clearly, if more respective transmit antennas are employed, then the number of variables will increase correspondingly.

FIG. 22 illustrates an embodiment 2200 of diversity gain maximization for STBC and/or SFBC in accordance with 6×1 signaling. When operating to maximize the diagonal terms associated with equation 1 after undergoing modification with the increased number of antennas, then the summation term within the equation 1 is modified to correspond to the diagram.

Figure 23:
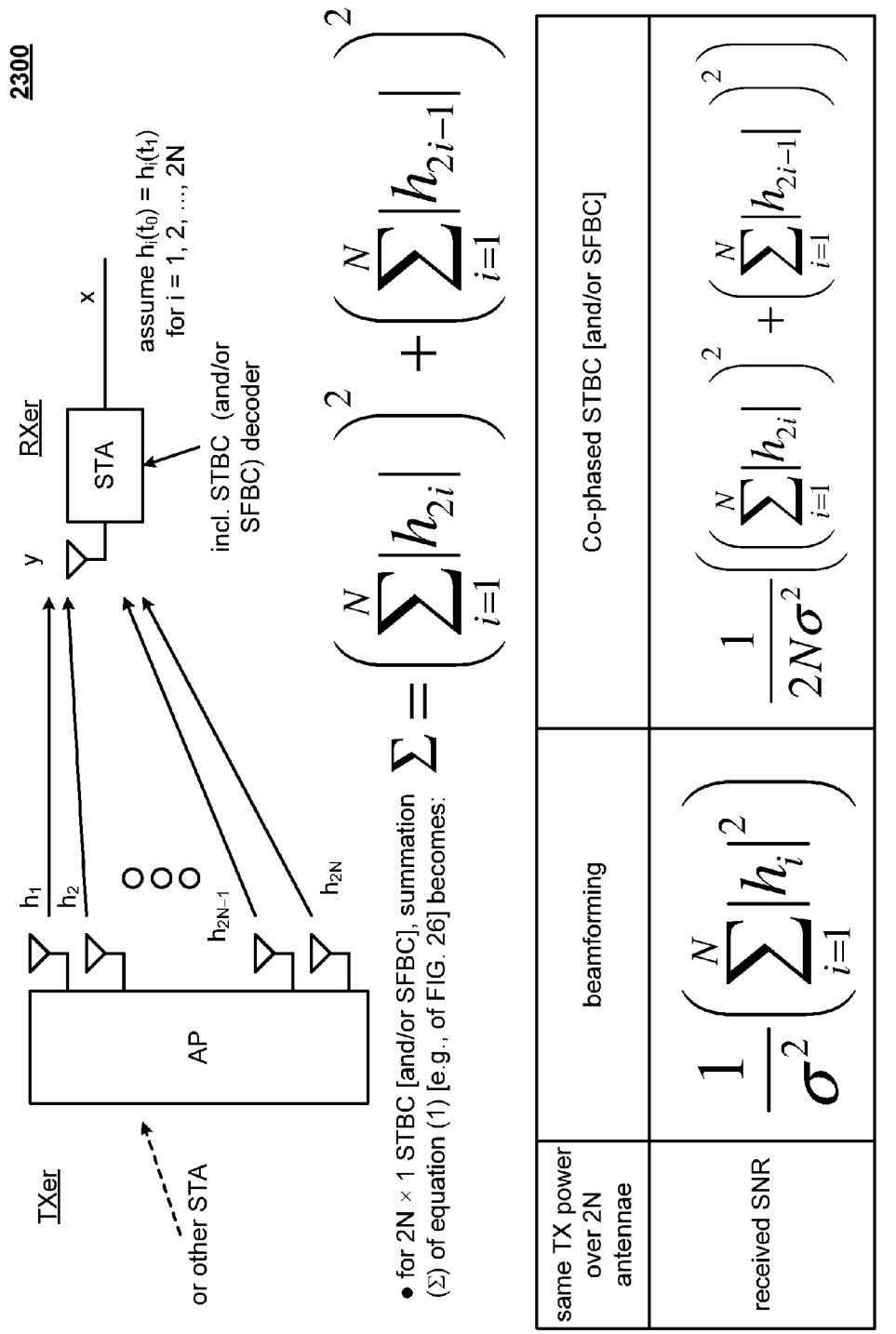
FIG. 23 illustrates an embodiment of generalized co-phased STBC and/or SFBC in accordance with 2N×1 signaling including relative receiver signal to noise ratio (SNR) comparison for beamforming and co-phased STBC and/or SFBC.

FIG. 23 illustrates an embodiment 2300 of generalized co-phased STBC and/or SFBC in accordance with 2N×1 signaling including relative receiver signal to noise ratio (SNR) comparison for beamforming and co-phased STBC and/or SFBC. Generally speaking, the number of transmit antenna may be increased to any desired number, 2N. That is to say, when multiple respective Alamouti pairs are repeated over space N times, then there are inner product combinations of odd channels $h_i$ (i=1, 3, . . . , 2N−1) and even channels $h_i$ (=2, 4, . . . , 2N). Rotation factors can be found to make each respective inner product to be real (e.g., that is to say, to maximize the real component portion thereof). The value of N corresponds to the number of Alamouti pairs repeated (e.g., if N≥2, such that N is 2 for 4×1 signaling, N is 3 for 4×1 signaling, etc.).

As may be seen as affected diagram, for 2N×1 signaling in accordance with co-phased STBC and/or SFBC, the summation term within the equation 1 is modified accordingly and as depicted within the middle portion of the diagram. Generally speaking, this summation term corresponds to the sum of the magnitude of all of the respective even channels and all of the respective odd channels.

If an assumption is made that the same transmit power is employed over all of the respective 2N transmit antennas, the received signal to noise ratio (SNR) (e.g., from the perspective of a receiver communication device) will be as depicted within the table shown at the bottom portion of the diagram. As may be seen, operating in accordance with co-phased STBC and/or SFBC, a received SNR may be achieved to be relatively close to that which is provided in accordance with beamforming. Again, it is noted that operation in accordance with Alamouti pairing will allow for a receiver communication device to perform Alamouti 2×1 decoding of each of the respective additional Alamouti pairs thereby not requiring any hardware modification whatsoever. Such processing, from the perspective of a receiver communication device, may be implemented wholly in accordance with baseband processing.

Moreover, the overhead associated with feedback employed for co-phased STBC and/or SFBC is significantly smaller than that which is required in accordance with beamforming. That is to say, such a feedback signal need not necessarily be very complex when operating in accordance with co-phased STBC and/or SFBC, and may be as small as 2 bits per tone (e.g., in accordance with orthogonal frequency division multiplexing (OFDM) signaling such as in accordance with 4×1 signaling) while still providing for very high performance and a nearly optimal solution. In addition, various means of aggregating feedback (e.g., such as in accordance with grouping) may be employed for further reduction of feedback overhead. Generally speaking, the feedback employed and required in accordance with such co-phased STBC and/or SFBC is significantly smaller in comparison to that which is required in accordance with beamforming feedback.

As has been described herein with respect to various embodiments and/or diagrams, a significant amount of transmit diversity may be achieved in accordance with co-phased Space-Time/Frequency Block Codes (STBC/SFBC) for transmit diversity. For example, co-phased STBC/SFBC may be viewed as being a hybrid between STBC/SFBC and transmitter beamforming, aimed at increasing range with reduced feedback overhead for short packet transmission (e.g., such as in accordance with IEEE 802.11ah). Generally, as may be understood with respect to the various embodiments and/or diagrams herein, N additional Alamouti pairs (e.g., Alamouti codes) may be employed on 2N co-phased transmit antennas. As the reader may understand, there may be no perfectly orthogonal STBC/SFBC codes for more than 2 transmit antennas (e.g., without performing any co-phase alignment). However, even if such orthogonal STBC/SFBC codes do in fact exist or could be found, there is a 10 log 10(2N) performance penalty compared to closed loop beamforming (e.g., 6 dB for 4 transmit antennas), due at least in part to the fact that transmit power is divided equally among the antennas in STBC/SFBC schemes. With co-phased STBC/SFBC, however, not only is orthogonality restored among antennas, the 10 log 10(2N) penalty barrier is also broken as a result of co-phasing. For 4 transmit antennas, a gap of only 4 dB or less may be achieved compared to optimum closed-loop beamforming. Again, the amount of feedback overhead required for co-phased STBC and/or SFBC may be significantly less than that which is required in accordance with closed loop beamforming.

Furthermore, co-phased STBC/SFBC is transparent to a receiver communication device (e.g., it appears only as a single Alamouti-coded signal from the perspective of such a receiver vacation device). As such, there is relatively little implementation impact, if any, for any standard that already uses Alamouti for transmit diversity (e.g., such as those operative in accordance with IEEE 802.11n/ac/ah, LTE and LTE/Advanced, and/or other standards, protocols, and the recommended practices).

As may be understood with respect to the various embodiments and/or diagrams herein, various aspects, embodiments, and/or their equivalents, of the invention may provide for an improved (or optimum) scheme that is general to any 2N or Nt transmit antennas. With respect to co-phased STBC and/or SFBC in comparison to phase aligned STBC and/or SFBC, co-phased STBC and/or SFBC may be viewed as allowing for phase shift to be respectively and individually implemented for each of the respective antennas within a given device. Of course, certain embodiments operating in accordance with phase aligned STBC and/or SFBC may employ only a single phase shift for a second pair of antennas and may be viewed as being one particular embodiment of co-phased STBC and/or SFBC. Generally speaking, different respective embodiments may selectively and individually employed appropriate phase rotation and/or shifting with respect to each of the respective signal portions transmitted via the different respective transmit antennas within a given communication device (e.g., including those transmitted via different respective Alamouti pairs associated with different antennas pairs within the communication device).

It is also noted that any one or more of the various aspects, embodiments, and/or their equivalents, of the invention may also be extended to embodiments including an odd number of antennas. In addition, as will be seen, when the number of transmit antennas exceeds 4, certain embodiments may operate without necessarily using a closed form solution for identifying one or more rotation values or angles, c (or $c_{i,j}$), as described within certain embodiments), that may be fed back in used for adapting subsequent transmissions. For example, in certain embodiments, each respective value of c may be limited to one or two bits rotation. Even within certain implementation to do not provide necessarily a closed form solution for calculating one or more rotation values or angles, c (or $c_{i,j}$), a brute force search may nonetheless be performed that may consider all possible combinations. Then, one or more of the respective values associated with all or some of these various combinations may be employed for feeding back one or more rotation values or angles, c (or $c_{i,j}$).

An alternative approach, instead of performing a complete brute force approach to identify the respective values for all possible commendations, a subset of the one or more rotation values or angles, c (or $c_{i,j}$), may alternatively be identified in the search process. As an example, if a relatively large number of combinations exist (e.g., such as determined with respect to any desired threshold, which may be predetermined, calculated in real-time, adaptively modified over time based on any of a number of considerations including local operating conditions, remote operating conditions, communication channel status and/or variability, etc.), then there may be some difficulty in finding a perfect/best solution. As such, within such situations, a subset of the one or more rotation values or angles, c (or $c_{i,j}$), may be selected (based upon any desired criteria or criterion) to be calculated. After such calculation, a subset of those one or more rotation values or angles, c (or $c_{i,j}$), may be particularly identified as providing the relatively greatest impact, based on the order of magnitude of the h-product term(s) (e.g., such as in accordance with the cost function maximization process), and the solution may be maximized relatively for them (e.g., in accordance with a best M approach such that the subset of those one or more rotation values or angles, c (or $c_{i,j}$), may correspond to the best M or greatest contributing M h-product term(s)).

As such, as may be understood, any one or more of the various aspects, embodiments, and/or their equivalents, of the invention may be extended to implementation's including any desired odd number of antennas within a wireless communication device. In addition, as will be seen, the signal to noise ratio (SNR) formula is also updated with respect to ceiling and floor functions. The search for one or more rotation values or angles, c (or $c_{i,j}$), may be performed in accordance with in accordance with either a brute force or a best M search approach.

Figure 24:
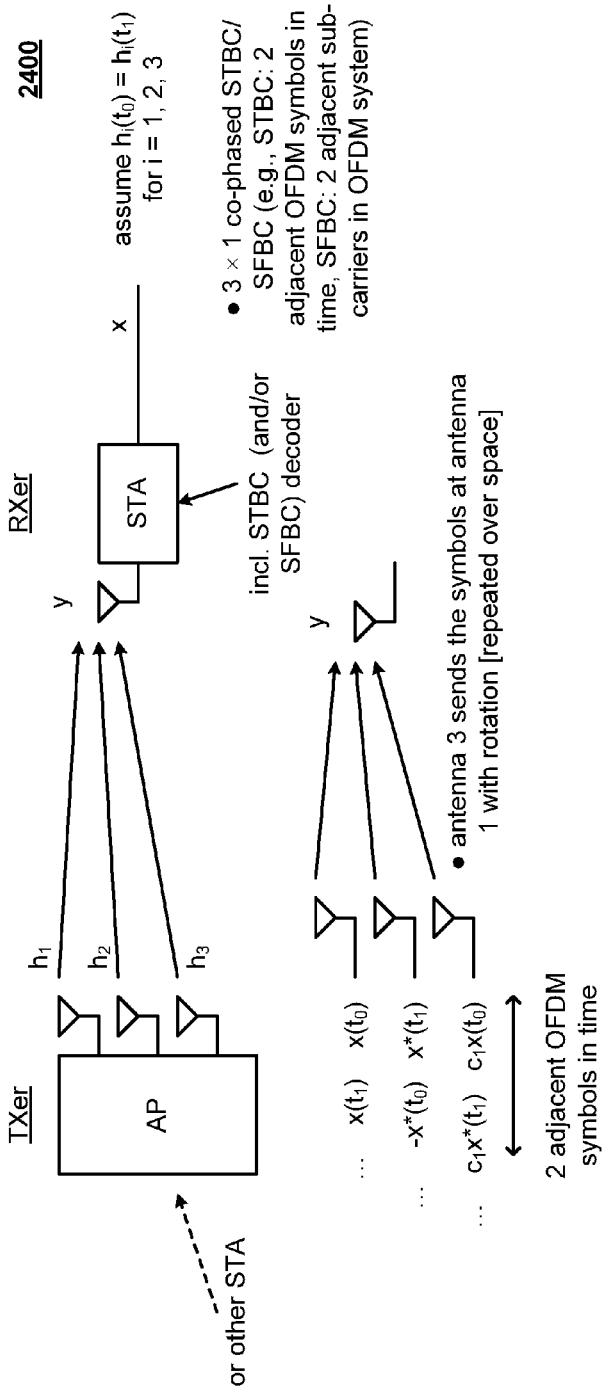
FIG. 24 illustrates an embodiment of co-phased STBC and/or SFBC in accordance with 3×1 signaling.

FIG. 24 illustrates an embodiment 2400 of co-phased STBC and/or SFBC in accordance with 3×1 signaling. As may be seen with respect to this diagram, a wireless communication device may be implemented to employ three antennas in accordance with co-phased STBC and/or SFBC operating in accordance with 3×1 signaling. When compared to a 4×1 signaling approach, a fourth antennas may be viewed as either not being employed or not being implemented within the wireless communication device. As such, the fourth respective channel, $h_4$, may be viewed as having a numerical value of zero (0), and as such, there is no need for calculating the corresponding rotation value or angle, $c_2$ (e.g., only $c_1$ remains in the calculation because the fourth respective channel, $h_4$, is gone). As may be understood with respect to this diagram as well as the suspect to other embodiments and/or diagrams, those which have applicability in accordance with STBC signaling may alternatively or conjunctively be performed in accordance with SFBC signaling (e.g., either STBC or SFBC signaling may be employed, or both STBC and SFBC signaling may be employed).

As may be understood with respect to the diagram, antenna 3 sends the symbols at antenna 1 with rotation [repeated over space]. In a situation when a long training field (LTF) is sent within a packet, to respective LCS may be sent (e.g., the first LTF via antennas 1 and 3, and the second LTF via antenna 2). The channel measurement may be made in accordance with $h_1+c_1 \times h_3$ and $h_2$, respectively. At the transmitter device, the transmitter operates in accordance with 3 TX (e.g., employs 3 transmit antennas), yet the packets look like 2 TX Alamouti. At the receiver device, the receiver device may operate in accordance with Alamouti pair coding. That is to say, it is noted that operation in accordance with Alamouti pairing will allow for a receiver communication device to perform Alamouti 2×1 decoding of each of the respective additional Alamouti pairs thereby not requiring any hardware modification whatsoever. Such processing, from the perspective of a receiver communication device, may be implemented wholly in accordance with baseband processing.

FIG. 25 illustrates an embodiment 2500 of diversity gain maximization for co-phased STBC and/or SFBC in accordance with 3×1 signaling. As may be seen with respect to this diagram, for co-phase 3×1 STBC and/or SFBC, appropriately only one selected value, c1, for rotation may be made to maximize the diagonal terms associated with equation 2.

Again, as may be understood with respect to other embodiments and/or diagrams herein, there may alternatively be it situations where more than one phase rotation or value may be respectively employed for the different respective signals transmitted via different respective antennas within one or more Alamouti pairs. As such, different respective of values may be used for respectively rotating different signal portions associated with different antennas of one or more Alamouti pairs.

With respect to feedback provided from a receiver communication device to a transmitter communication device, the relatively simplest feedback may be composed of 1 bit. For example, if the real portion associated with the respective value, a, is greater than zero, then the feedback bit associated with that value may be set to 1; otherwise, the feedback bit associated with that value may be set to −1.

Figure 26:
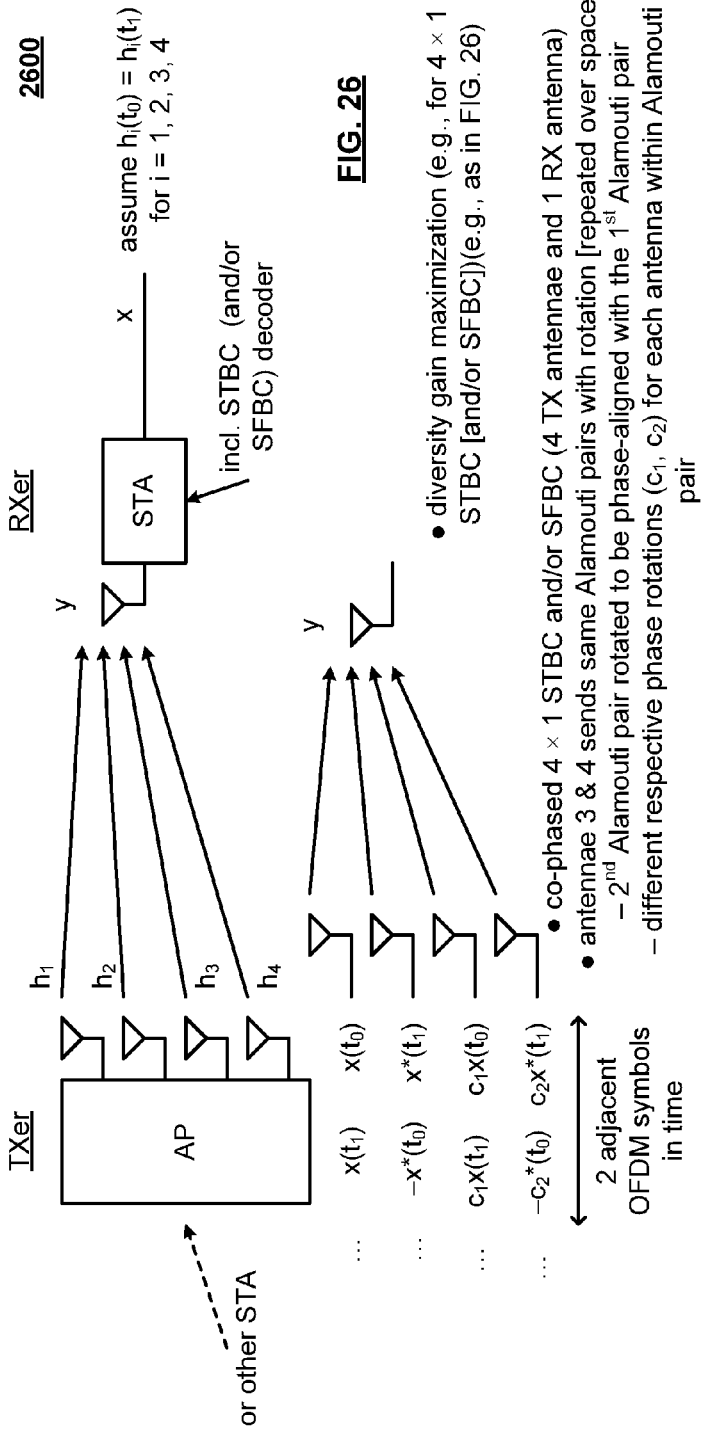
FIG. 26 illustrates an alternative embodiment of co-phased STBC and/or SFBC in accordance with 4×1 signaling.

FIG. 26 illustrates an alternative embodiment 2600 of co-phased STBC and/or SFBC in accordance with 4×1 signaling. This diagram has some similarities to the embodiment 1900 FIG. 19, with at least one difference being that the relative signs preceding the various terms within the channel matrix (e.g., h-related terms) may be slightly different. Considering these relative differences in sign, the reader is referred to the description related to FIG. 19 for similarity of operation between these respective embodiments 1900 and 2600, respectfully.

Figure 27:
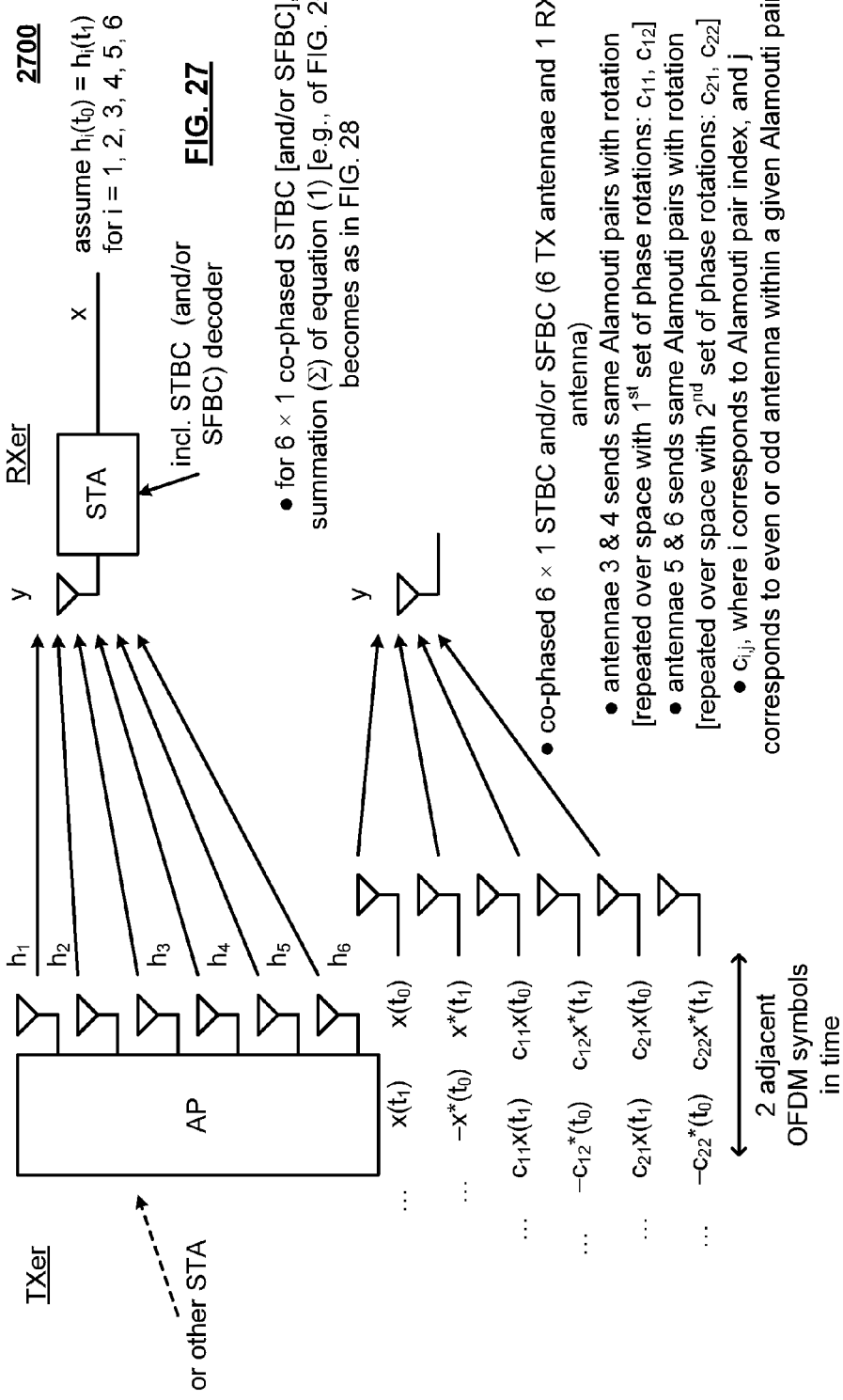
FIG. 27 illustrates an alternative embodiment of co-phased STBC and/or SFBC in accordance with 6×1 signaling.

FIG. 27 illustrates an alternative embodiment 2700 of co-phased STBC and/or SFBC in accordance with 6×1 signaling. This diagram has some similarities to the embodiment 2100 FIG. 21, with at least one difference being that the relative signs preceding the various terms within the channel matrix (e.g., h-related terms) may be slightly different. Considering these relative differences in sign, the reader is referred to the description related to FIG. 21 for similarity of operation between these respective embodiments 2100 and 2700, respectfully.

Within this diagram as well as the diagram associated with FIG. 21, given that there are 6 respective transmit antennas and operate in accordance with 6×1 signaling, there are three respective variables, $\alpha$, $\beta$, and $\gamma$. As such, there are eight respective choices respect to this embodiment 3200 for each of the respective values. Clearly, if more respective transmit antennas are employed, then the number of variables will increase correspondingly.

Figure 28:
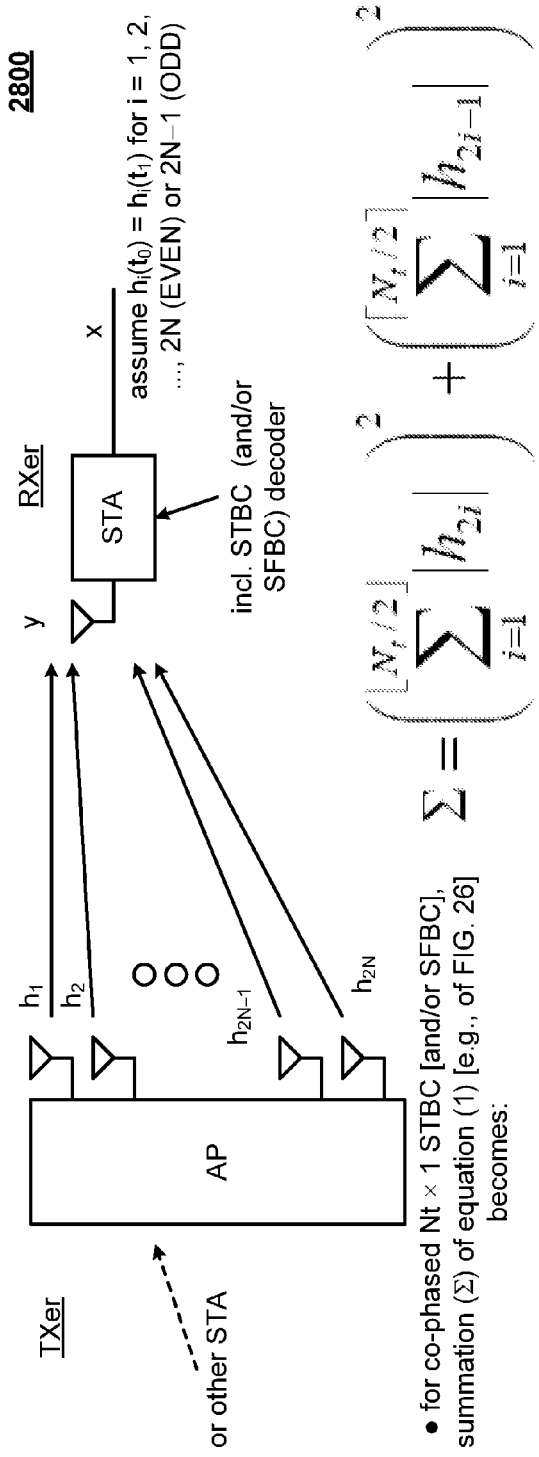
FIG. 28 illustrates an embodiment of generalized co-phased STBC and/or SFBC in accordance with Nt×1 signaling (e.g., for either even or odd numbers of transmit antennas).

FIG. 28 illustrates an embodiment 2800 of generalized co-phased STBC and/or SFBC in accordance with Nt×1 signaling (e.g., for either even or odd numbers of transmit antennas). As may be seen with respect to this diagram which is directed towards any desired number of transmit antennas, whether an even number or an odd number of antennas) when Alamouti pairs are repeated over space a particular number of times (e.g., N times, where Nt=2N, and Nt corresponds to the number of transmit antennas), there are inner product combinations of odd channels $h_i$ (i=1, 3, 5, . . . , 2N−1) and even channels $h_i$ (i=2, 4, . . . , 2N). The corresponding respective rotation values or angles, c (or $c_{i,j}$), may be found to make each respective inner product real (e.g., include no respective imaginary component). When the number of transmit antennas, Nt, is an odd number, the respective index, i, will correspondingly be not more than 2N−1.

As the reader will understand, the respective floor and ceiling functions are employed to determine the particular index to which each of the respective summations are performed as depicted within the diagram.

Figure 29:
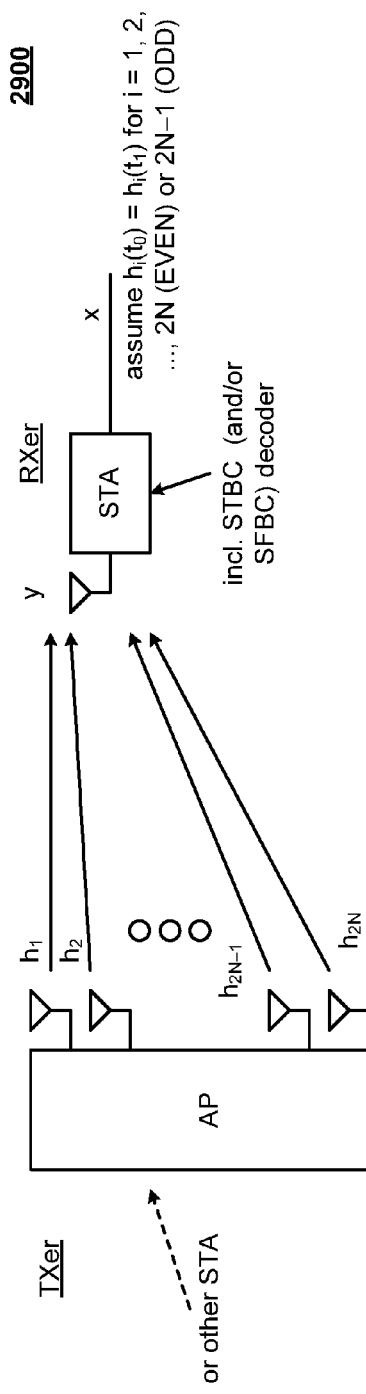
FIG. 29 illustrates an embodiment of generalized co-phased STBC and/or SFBC in accordance with Nt×1 signaling (e.g., for either even or odd numbers of transmit antennas) including the solution for appropriate rotation for Nt×1.

FIG. 29 illustrates an embodiment 2900 of generalized co-phased STBC and/or SFBC in accordance with Nt×1 signaling (e.g., for either even or odd numbers of transmit antennas) including the solution for appropriate rotation for Nt×1. In addition, this diagram also is directed towards any desired number of transmit antennas, whether an even number or an odd number of antennas) when Alamouti pairs are repeated over space a particular number of times (e.g., N times, where Nt=2N, and Nt corresponds to the number of transmit antennas). The corresponding cost function to maximize his depicted in the autumn portion of the diagram. As also described with respect to other embodiments under diagrams, for a given rotation value, $c_{i,j}$, the value of i corresponds to the additional Alamouti pair index, and the value of j corresponds to the particular antenna (e.g., even or odd antenna) within a given Alamouti pair. For example, the value of $c_{1,1}$ corresponds to the first Alamouti pair index and the first antenna within that particular Alamouti pair, while the value of $c_{1,2}$ corresponds also to that first Alamouti pair index but instead corresponds to the second antennas within a particular Alamouti pair. As may be seen within this diagram, an additional variable, k, is included for certain situations (e.g., such as corresponding to the number of antennas exceeding 2, or being viewed as the index that is employed for those antennas beyond the initial 2 antennas, and in which case there may be multiple respective rotation vectors).

Figure 30:
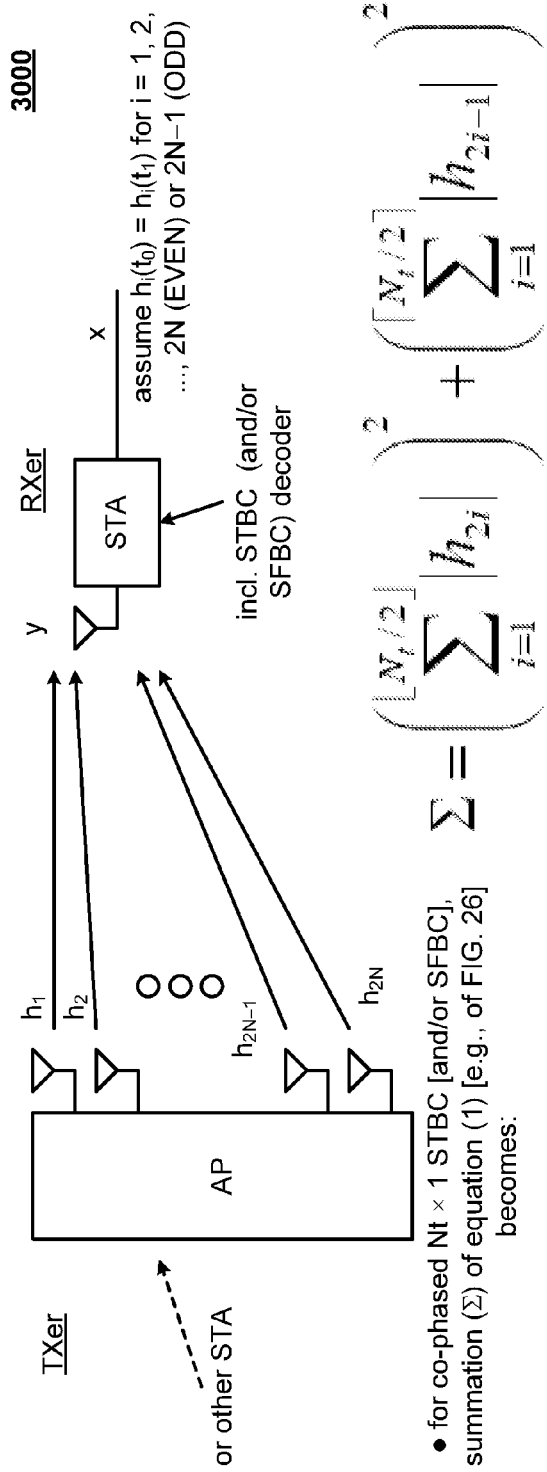
FIG. 30 illustrates an embodiment of generalized co-phased STBC and/or SFBC in accordance with Nt×1 signaling including relative receiver signal to noise ratio (SNR) comparison for beamforming and co-phased STBC and/or SFBC.

FIG. 30 illustrates an embodiment 3000 of generalized co-phased STBC and/or SFBC in accordance with Nt×1 signaling including relative receiver signal to noise ratio (SNR) comparison for beamforming and co-phased STBC and/or SFBC. Generally speaking, the number of transmit antenna may be increased to any desired number, Nt. That is to say, when Alamouti pairs are repeated over space a particular number of times (e.g., N times, where Nt=2N, and Nt corresponds to the number of transmit antennas), there are inner product combinations of odd channels $h_i$ (i=1, 3, 5, ..., 2N−1) and even channels $h_i$ (i=2, 4, ..., 2N). Rotation factors can be found to make each respective inner product to be real (e.g., that is to say, to maximize the real component portion thereof).

As may be seen as affected diagram, for 2N×1 signaling in accordance with co-phased STBC and/or SFBC, the summation term within the equation 1 is modified accordingly and as depicted within the middle portion of the diagram. Generally speaking, this summation term corresponds to the sum of the magnitude of all of the respective even channels and all of the respective odd channels.

If an assumption is made that the same transmit power is employed over all of the respective Nt transmit antennas, the received signal to noise ratio (SNR) (e.g., from the perspective of a receiver communication device) will be as depicted within the table shown at the bottom portion of the diagram. As may be seen, operating in accordance with co-phased STBC and/or SFBC, a received SNR may be achieved to be relatively close to that which is provided in accordance with beamforming. Again, it is noted that operation in accordance with Alamouti pairing will allow for a receiver communication device to perform Alamouti 2×1 decoding of each of the respective additional Alamouti pairs thereby not requiring any hardware modification whatsoever. Such processing, from the perspective of a receiver communication device, may be implemented wholly in accordance with baseband processing.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

While particular combinations of various functions and features of the present invention have been expressly described herein, other combinations of these features and functions are likewise possible. The present invention is not limited by the particular examples disclosed herein and expressly incorporates these other combinations.

What is claimed is:
1. A communication device, comprising:
a baseband processing module to:
  generate a channel estimate of at least one communication pathway between the communication device and the at least one remote communication device having a plurality of transmit antennas; and
  based on the channel estimate, generate a feedback signal including a selected one of: space time block coding (STBC), space frequency block coding (SFBC), hybrid space time/frequency block coding (ST/FBC), or single stream multi-antenna spatial mapping wherein the baseband processing module generates the feedback signal by:
  when one of a plurality of channel correlations exceeds a threshold, select one of: the STBC, SFBC, or hybrid ST/FBC, and generate the feedback signal based on selection thereof;
  when the one of the plurality of channel correlations does not exceed the threshold, select single stream multi-antenna spatial mapping and generate the feedback signal based on selection thereof;
a transmitter, coupled to the baseband processing module to:
  transmit the feedback signal to the remote communication device.

2. The communication device of claim 1, wherein:
the feedback signal includes 2 bits having a first set of values of the 2 bits corresponding to STBC, a second set of values of the 2 bits corresponding to SFBC, a third set of values of the 2 bits corresponding to hybrid ST/FBC, or a fourth set of values of the 2 bits corresponding to single stream multi-antenna spatial mapping.

3. The communication device of claim 1, wherein the baseband processing module generates the feedback signal by calculating a plurality of channel correlations based on at least one of the channel estimate and at least one additional channel estimate.

4. The communication device of claim 1, wherein the communication device is one of: a wireless station (STA) or a wireless access point (AP).

5. The communication device of claim 1, wherein the baseband processing module generates the feedback signal by:
  characterizing the channel estimate based on at least one of a fading characteristic and a frequency response characteristic to generate a characterization of the channel estimate.

6. The communication device of claim 1, wherein the remote communication device is one of: a wireless station (STA) and a wireless access point (AP).

7. The communication device of claim 1, wherein the remote communication device is an access point (AP).

8. A communication device, comprising:
a receiver to:
  receive a feedback signal from a remote communication device;
a transmitter, coupled to the receiver, to:
  select a coding, based on the feedback signal, as one of: space time block coding (STBC), space frequency block coding (SFBC), hybrid space time/frequency block coding (ST/FBC), or single stream multi-antenna spatial mapping, wherein the remote communication device generates the feedback signal by:
    when one of a plurality of channel correlations exceeds a threshold, select one of: the STBC, SFBC, or hybrid ST/FBC, and generate the feedback signal based on selection thereof;
    when the one of the plurality of channel correlations does not exceed the threshold, select single stream multi-antenna spatial mapping and generate the feedback signal based on selection thereof;
  generate a transmit signal in accordance with the selected coding; and
  transmit the transmit signal to the remote communication device via a plurality of antennas.

9. The communication device of claim 8, wherein:
the feedback signal includes 2 bits having a first set of values of the 2 bits corresponding to STBC, a second set of values of the 2 bits corresponding to SFBC, a third set of values of the 2 bits corresponding to hybrid ST/FBC, or a fourth set of values of the 2 bits corresponding to single stream multi-antenna spatial mapping.

10. The communication device of claim 8, wherein the remote communication device generates the feedback signal by calculating a plurality of channel correlations based on at least one of the feedback signal or at least one additional feedback signal.

11. The communication device of claim 8, wherein the communication device is one of: a wireless station (STA) or a wireless access point (AP).

12. The communication device of claim 8, wherein the remote communication device generates the feedback signal by:
  characterizing feedback signal based on at least one of a fading characteristic and a frequency response characteristic to generate a characterization of the feedback signal.

13. The communication device of claim 8, wherein the remote communication device is a wireless station (STA).

14. The communication device of claim 8, wherein the remote communication device is an access point (AP).

15. A communication device, comprising:
a transmitter to:
  select a coding as one of: space time block coding (STBC), space frequency block coding (SFBC), hybrid space time/frequency block coding (ST/FBC), or single stream multi-antenna spatial mapping, wherein the transmitter selects the coding by:
    when one of a plurality of channel correlations exceeds a threshold, select one of: the STBC, SFBC, or hybrid ST/FBC;
    when the one of the plurality of channel correlations does not exceed the threshold, select single stream multi-antenna spatial mapping;
  generate a transmit signal in accordance with the selected coding; and
  transmit the transmit signal to a remote communication device via a plurality of antennas.

16. The communication device of claim 15, wherein the hybrid space time/frequency block coding (ST/FBC) includes N symbols processed in blocks of A time symbols and B frequency symbols, where N=A+B.

17. The communication device of claim 16, wherein the remote communication device recovers transmitted data by combining the A time symbols and B frequency symbols.

18. The communication device of claim 15, wherein the hybrid space time/frequency block coding (ST/FBC) includes blocks four symbols into a combination of two time symbols and two frequency symbols.

19. The communication device of claim 15, wherein the remote communication device is a wireless station (STA).

20. The communication device of claim 15, wherein the remote communication device is a wireless access point (AP).

* * * * *